(12) United States Patent
Andersson et al.

(10) Patent No.: US 12,177,829 B2
(45) Date of Patent: Dec. 24, 2024

(54) SIGNALLING FOR REPETITION

(71) Applicant: Telefonaktiebolaget LM Ericsson (publ), Stockholm (SE)

(72) Inventors: Mattias Andersson, Sundbyberg (SE); Kittipong Kittichokechai, Järfälla (SE); Yufei Blankenship, Kildeer, IL (US); Robert Baldemair, Solna (SE); Jonas Fröberg Olsson, Ljungsbro (SE); Sorour Falahati, Stockholm (SE); Niklas Andgart, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 763 days.

(21) Appl. No.: 17/275,210

(22) PCT Filed: Sep. 27, 2019

(86) PCT No.: PCT/IB2019/058246
§ 371 (c)(1),
(2) Date: Mar. 11, 2021

(87) PCT Pub. No.: WO2020/065617
PCT Pub. Date: Apr. 2, 2020

(65) Prior Publication Data
US 2022/0061067 A1    Feb. 24, 2022

Related U.S. Application Data

(60) Provisional application No. 62/738,479, filed on Sep. 28, 2018.

(51) Int. Cl.
*H04W 72/1263* (2023.01)
*H04L 1/08* (2006.01)
(Continued)

(52) U.S. Cl.
CPC ........... *H04W 72/1263* (2013.01); *H04L 1/08* (2013.01); *H04W 72/0446* (2013.01); *H04W 72/23* (2023.01)

(58) Field of Classification Search
CPC ......... H04W 72/1263; H04W 72/0446; H04W 72/23; H04L 1/08
See application file for complete search history.

(56) References Cited

U.S. PATENT DOCUMENTS

| 11,576,158 B2* | 2/2023 | Liu .................. H04W 72/0453 |
| 2017/0265186 A1 | 9/2017 | Cariou et al. |

(Continued)

FOREIGN PATENT DOCUMENTS

| CN | 104363624 A | 2/2015 |
| CN | 106027197 A | 10/2016 |

(Continued)

OTHER PUBLICATIONS

International Search Report and Written Opinion for PCT/IB2019/058246 dated Dec. 17, 2019, 16 pages.

(Continued)

*Primary Examiner* — Mohammad S Anwar
(74) *Attorney, Agent, or Firm* — Rothwell, Figg, Ernst & Manbeck, P.C.

(57) ABSTRACT

In one aspect, there is a method performed by a wireless device, WD. The method includes the WD receiving a control message, the control message comprising an indication of an index value. The method further includes the WD obtaining, using the index value, a set of parameters from time domain resource allocation, TDRA, configuration information, the set of parameters comprising an aggregation factor.

10 Claims, 20 Drawing Sheets

(51) Int. Cl.
*H04W 72/0446* (2023.01)
*H04W 72/23* (2023.01)

(56) References Cited

U.S. PATENT DOCUMENTS

| | | | |
|---|---|---|---|
| 2018/0132244 A1 | 5/2018 | Huang et al. | |
| 2018/0234968 A1 | 8/2018 | Sun et al. | |
| 2019/0342921 A1* | 11/2019 | Loehr | H04L 5/0044 |
| 2020/0106566 A1* | 4/2020 | Yeo | H04W 28/04 |

FOREIGN PATENT DOCUMENTS

| | | | |
|---|---|---|---|
| CN | 108012312 A | 5/2018 |
| CN | 112075046 A | 12/2020 |
| EP | 3 200 542 A1 | 8/2017 |
| JP | 2016-527831 A | 9/2016 |
| WO | 2018141932 A1 | 8/2018 |
| WO | 2019211667 A2 | 11/2019 |

OTHER PUBLICATIONS

Intel Corporation, "Remaining issues of UL transmission procedures," 3GPP Draft; R1-1802416 Intel—UL Proc, 3rd Generation Partnership Project (3GPP), Mobile Competence Centre; 650, Route DES Lucioles; F-06921 Sophia-Antipolis Cedex, France, vol. RAN WG1, No. Athens, Greece; Feb. 26, 2018-Mar. 2, 2018, Feb. 17, 2018, XP051397941, http://www.3gpp.org/ftp/tsg%5Fran/WG1%5FRL1/TSGR1%5F92/Docs, 4 pages.

Wang, Z., and Luo, S., "Design and Improvement of RRC Message Transmission Scheme in LTE System," Telecommunication Engineering, vol. 50, No. 9, Sep. 2010, 5 pages.

LG Electronics, "Remaining issues on UL data transmission procedure," 3GPP TSG RAN WG1 Meeting #92 R1-1802215, Athens, Greece, Feb. 26-Mar. 2, 2018, 13 pages.

3rd Generation Partnership Project; Technical Specification Group Radio Access Network; 5G; NR; "Physical layer procedures for data" (Release 15), 3GPP TS 38.214, V15.2.0, Sophia Antipolis Cedex—France, 2018, 95 pages.

* cited by examiner

SIGNALLING FOR REPETITION

CROSS REFERENCE TO RELATED APPLICATION(S)

This application is a 35 U.S.C. § 371 National Stage of International Patent Application No. PCT/IB2019/058246, filed Sep. 27, 2019, claiming benefit from provisional U.S. Patent Application No. 62/738,479, filed Sep. 28, 2018, designating the United States.

TECHNICAL FIELD

This disclosure relates to repetition signalling in a communications network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In 5G New Radio (NR) Release 15, slot-aggregation is supported both for downlink (DL) and uplink (UL) transmissions, which is beneficial for enhancing coverage and improving reliability. With slot-aggregation, the Physical Downlink Shared Channel (PDSCH) and Physical Uplink Shared Channel (PUSCH) transmissions can be repeated in multiple slots when the Radio Resource Control (RRC) parameter for slot aggregation is configured. The corresponding RRC parameter is referred to as pdsch-AggregationFactor, pusch-AggregationFactor, repK for PDSCH, grant based PUSCH and grant-free PUSCH, respectively. The relevant Information Elements (IEs) from TS 38.331 are listed in the table below to illustrate the usage of these parameters.

TABLE 1

| PDSCH-Config information element |
|---|
| -- ASN1START |
| -- TAG-PDSCH-CONFIG-START |
| PDSCH-Config ::=                SEQUENCE { |
| ... |
|    resourceAllocation                    ENUMERATED { resourceAllocationType0, resourceAllocationType1, dynamicSwitch}, |
|       pdsch-TimeDomainAllocationList     SetupRelease { PDSCH-TimeDomainResourceAllocationList }   OPTIONAL, -- Need M |
|       pdsch-AggregationFactor            ENUMERATED { n2, n4, n8 } |
| ... |
| } |

| PUSCH-Config information element |
|---|
| PUSCH-Config ::=                SEQUENCE { |
| ... |
|    resourceAllocation                    ENUMERATED { resourceAllocationType0, resourceAllocationType1, dynamicSwitch}, |
|       pusch-TimeDomainAllocationList     SetupRelease { PUSCH-TimeDomainResourceAllocationList }   OPTIONAL, -- Need M |
|    pusch-AggregationFactor               ENUMERATED { n2, n4, n8 } |
|                                          OPTIONAL, -- Need S |
| ... |
| } |

| ConfiguredGrantConfig information element |
|---|
| ConfiguredGrantConfig ::=    SEQUENCE { |
| ... |
|    repK                                  ENUMERATED {n1, n2, n4, n8}, |
| } |

When a User Equipment (UE) is scheduled by DL assignment or DL Semi-Persistent Scheduling (SPS) for PDSCH transmission in a given slot, the signalled resource allocation for the PDSCH is used for number of consecutive slots if the aggregation factor is configured with a larger value than 1. In this case, the PDSCH is repeated with different redundancy versions in those slots for transmission of the corresponding transport blocks (TBs). The same procedure is applied for UL where a UE is scheduled by UL assignment or grant-free for PUSCH transmission in a slot and is configured for slot aggregations. In this case the UE uses the signalled resource allocation in the number of slots given by the aggregation factors using different redundancy versions for the transmission of corresponding TBs.

In NR Rel-15, the Time Domain Resource Allocation (TDRA) information for a PDSCH transmission in a slot includes information such that the UE can determine the slot that the PDSCH is expected to be received (a.k.a. K0), the starting symbol in the slot for PDSCH reception and the length or duration of PDSCH reception (a.k.a. SLIV). The UE is also provided with the mapping type which is used to determine the DeModulation Reference Signal (DMRS) positions. In NR, there are TDRA tables specified consisting of different combinations of K0, SLIV, etc. The UE can be signaled an index to a row in the table that provides information on K0 and SLIV to be used for reception.

A similar procedure is applied for PUSCH transmissions where the slot intended for PUSCH transmission is obtained from a field in UL assignment, given by K2. The SLIV information is provided similarly as DL reception as well as the mapping type by UL assignment and/or configuration.

The TDRA are the time domain resource allocation for the first instant of PDSCH reception or PUSCH transmissions. As described above, if the UE is configured with the aggregation factor, the transmission in that slot is repeated in multiple slots based on the aggregation factor.

The relevant Information Elements (IEs) from TS 38.331 are listed in the tables below to illustrate the usage of these parameters.

TABLE 2

| PDSCH-TimeDomainResourceAllocationList information element |
| --- |
| -- ASN1START<br>-- TAG-PDSCH-TIMEDOMAINRESOURCEALLOCATIONLIST-START<br>PDSCH-TimeDomainResourceAllocationList ::= SEQUENCE (SIZE(1.. maxNrofDL-Allocations)) OF PDSCH-TimeDomainResourceAllocation<br>PDSCH-TimeDomainResourceAllocation ::= SEQUENCE {<br>k0                                      INTEGER(0..32)        OPTIONAL,<br>mappingType                   ENUMERATED {typeA, typeB},<br>startSymbolAndLength       INTEGER (0..127)<br>}<br>-- TAG-PDSCH-TIMEDOMAINRESOURCEALLOCATIONLIST-S TOP<br>-- ASN1STOP |

TABLE 3

| PDSCH-TimeDomainResourceAllocation field descriptions |
| --- |
| k0 |
| The n1 corresponds to the value 1, n2 corresponhds to value 2, and so on. Corresponds to L1 parameter 'K0' (see 38.214, section FFS_Section) When the field is absent the UE applies the value 0. |
| mappingType |
| PDSCH mapping type. Corresponds to L1 parameter 'Mapping-type' (see 38.214, section FFS_Section) |
| startSymbolAndLength |
| An index into a table/equation in RAN1 specs capturing valid combinations of start symbol and length (jointly encoded).<br>Corresponds to L1 parameter 'Index-start-len'(see 38.214, section FFS Section) |

TABLE 4

| PUSCH-TimeDomainResourceAllocation information element |
| --- |
| -- ASN1START<br>-- TAG-PUSCH-TIMEDOMAINRESOURCEALLOCATIONLIST-START<br>PUSCH-TimeDomainResourceAllocationList ::= SEQUENCE (SIZE(1.. maxNrofUL-Allocations)) OF PUSCH-TimeDomainResourceAllocation<br>PUSCH-TimeDomainResourceAllocation ::= SEQUENCE {<br>  k2                                  INTEGER(0..32)       OPTIONAL,  -- Need S<br>  mappingType                 ENUMERATED {typeA, typeB},<br>  startSymbolAndLength     INTEGER (0..127)<br>}<br>-- TAG-PUSCH-TIMEDOMAINRESOURCEALLOCATIONLIST-STOP<br>-- ASN1STOP |

TABLE 5

PUSCH-TimeDomainResourceAllocationList field descriptions k2

Corresponds to L1 parameter 'K2' (see 38.214, section FFS_Section) When the field is absent the UE applies the value 1 when PUSCH SCS is 15/30 KHz; 2 when PUSCH SCS is 60 KHz and 3 when PUSCH SCS is 120 KHz.

mappingType

Mapping type. Corresponds to L1 parameter 'Mapping-type' (see 38.214, section FFS_Section)

startSymbolAndLength

An index into a table/equation in RAN1 specs capturing valid combinations of start symbol and length (jointly encoded) Corresponds to L1 parameter 'Index-start-len' (see 38.214, section FFS_Section)

In addition to the RRC configuration of time domain resource allocation of PDSCH and PUSCH, several default TDRA tables are also defined for PDSCH and PUSCH, respectively. The default tables can be used when PDSCH reception or PUSCH transmission are needed before RRC connections, for example during the initial access.

In LTE, the UE can be configured with different repetition factor or slot aggregation. However, with a field in the Downlink Control Information (DCI), the UE is dynamically indicated with the repetition factor or slot aggregation factor. The number of slots can be configured from the set {2, 4, 8}.

In LTE Rel-14 the feature PUSCH enhancement was introduced where the use of repetitions for PUSCH is dynamically configured (via DCI), and the number of repetitions that can be used is extended from 4 to a set {1, 2, 4, 8, 16, 32}.

There currently exist certain challenge(s). Semi-static signalling of the number of transmissions through for example RRC configuration of the slot aggregation factor applies to all transmissions, and therefore makes it impossible to apply a different number of repetitions to different transmissions with different reliability and latency requirements.

Additionally, an explicit field in the DCI for signalling the number of repetitions as in LTE makes the DCI payload larger. This has the effect of making the PDCCH transmission less reliable when using the same aggregation level. As a result the gNB might need to use a larger aggregation level which makes the risk for PDCCH blocking larger and uses more radio resources. Such a field in the DCI also applies to all possible resource allocations, and some combinations are unlikely to be used since other combinations achieve similar total transmissions lengths. For example, a 7-symbol transmission consisting of two transmissions in total can instead be scheduled using one 14 symbol transmission.

SUMMARY

Certain aspects of the present disclosure and their embodiments may provide solutions to these or other challenges. According to some aspects of the present disclosure, with respect to the default TDRA tables, the current TDRA table is extended to also contain a column for the number of repetitions and/or a column for the DMRS configuration. According to some aspects of the present disclosure, for the non-default TDRA configuration, an Aggregation Factor is made a part of TDRA configuration, so that the DCI index for the TDRA table also fetches the information about aggregation factor.

There are, proposed herein, various embodiments which address one or more of the issues disclosed herein.

According to one embodiment, a method performed by a wireless device for repetition signalling is provided. The method includes the step of receiving a control message, the control message comprising an indication of an index value. The method further includes the step of obtaining, using the index value, a set of parameters from time domain resource allocation (TDRA) configuration information, the set of parameters comprising an aggregation factor. In some embodiments, a wireless device for repetition signalling is provided, and the wireless device includes processing circuitry configured to perform the method.

According to another embodiment, a method performed by a base station for repetition signalling is provided. The method includes the step of generating a configuration message, the message comprising time domain resource allocation (TDRA) configuration information, the TDRA configuration information comprising an aggregation factor. The method further includes the step of transmitting the configuration message towards a wireless device. In some embodiments, a base station for repetition signalling is provided, and the base station includes processing circuitry configured to perform the method.

Certain embodiments may provide one or more of the following technical advantage(s). By extending the TDRA table, no extra DCI field is introduced, keeping the DCI payload smaller. Only relevant combinations of time domain resources and repetition factors will be configured. As an example, the combination of a 7 symbol transmission with repetition factor two will not be configured. Additionally, by extending the TDRA table with a specific DMRS configuration for each time duration and repetition factor, the DMRS configuration can be tuned to the exact length and number of transmissions thus reducing the DMRS overhead.

BRIEF DESCRIPTION OF DRAWINGS

The accompanying drawings, which are incorporated herein and form part of the specification, illustrate various embodiments.

DETAILED DESCRIPTION

Figure 1:
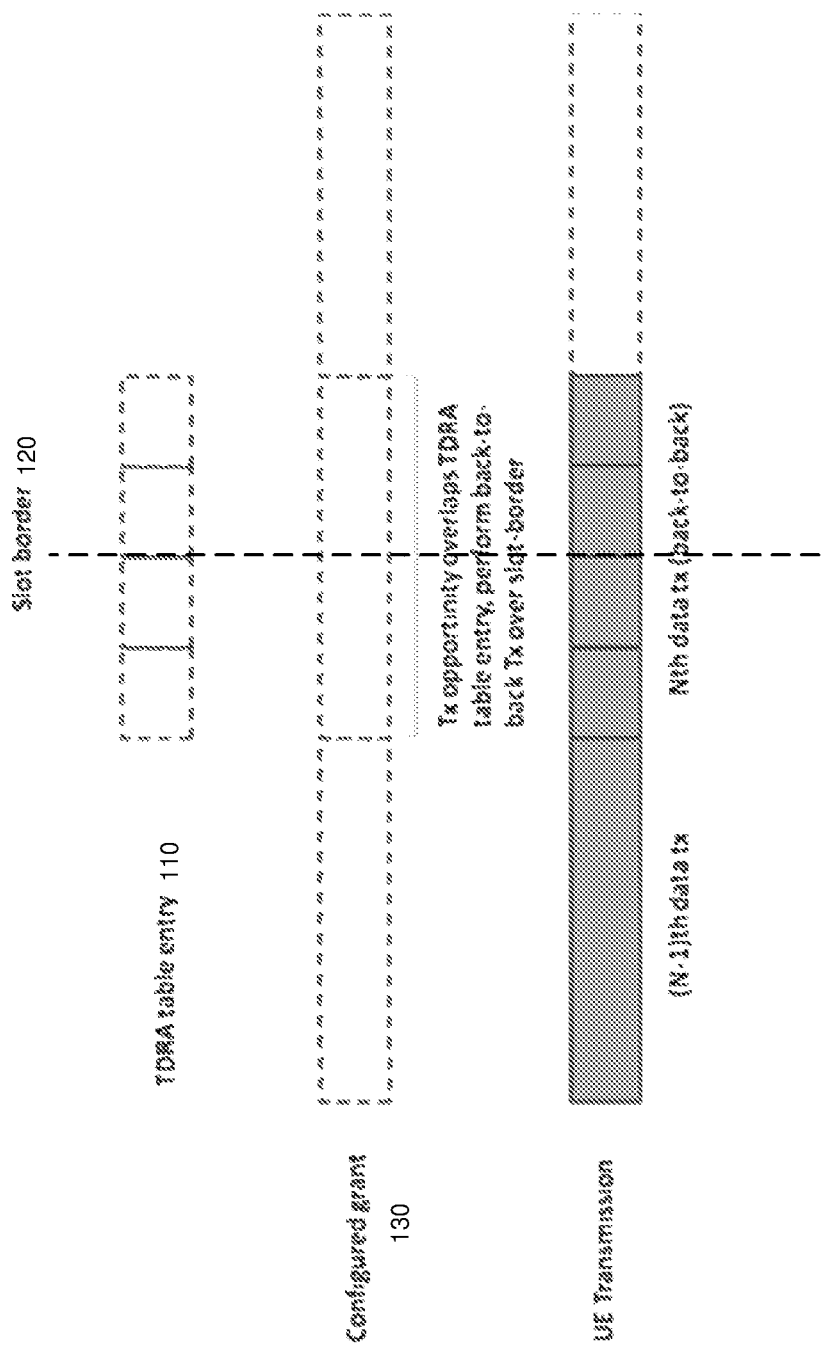
FIG. 1 is an example of repetition signalling, according to some embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document (s) provided in the Appendix.

In one non-limiting embodiment, the TDRA table is extended to include a column containing an aggregation factor. This aggregation factor works similarly to the slot-aggregation factor currently in NR, i.e. the transmission is repeated in the same symbols and frequency resources in different slots.

In one non-limiting embodiment the aggregation factor indicates the number of transmissions to be repeated back-to-back. For example, a transmission occupying symbols 0 and 1 with aggregation factor four will be transmitted four times in the same slot in symbols 0-1, 2-3, 4-5, and 6-7. The same frequency resources may be used for the repeated back-to-back transmissions. If frequency hopping is enabled, the frequency resources for each repeated transmission follows the frequency allocations as a result of hopping.

In one non-limiting embodiment there is an additional field indicating whether the repetition is made using slot aggregation or back-to-back.

In one non-limiting embodiment the repetition is made using slot aggregation for one set of transmission durations, and back-to-back for another set of transmission durations. For example the repetition could be made back-to-back if the duration $L<=7$, otherwise slot aggregation is used. The indicated repetition factor may in this case indicate back-to-back repetition ($L<=7$) and number of repeated slots otherwise.

In one non-limiting embodiment, the repetition is made using slot aggregation if type A scheduling is used, and back-to-back if type B scheduling is used.

In one non-limiting embodiment, the repetition is made using slot aggregation if type B scheduling is used, and back-to-back if type A scheduling is used.

In one non-limiting embodiment, if a back-to-back repetition would result in some transmissions at least partly occupying a different slot than the first transmission, the transmissions occupying different slots are dropped, i.e. not transmitted.

In one non-limiting embodiment, if a transmission in back-to-back repetition covering two slots is not dropped but shortened such that it does not cover two slots. In some such embodiments a selection is done to transmit the shortened transmission before the slot or after depending on the number of symbols before or after the slot. For example, if length of a shortened transmission before the slot is larger than length of a shorten transmission after the slot, then the shorten transmission is sent before the slot, otherwise it is sent after the slot.

In one non-limiting example, a resource allocation is repeated back-to-back as often as possible within a slot without crossing slot boundaries. In subsequent slot(s) the same procedure is applied, until the resource allocation is repeated as often as indicated. The repetition factor can either indicate the number of individual repetitions or the number of slots over which the resource allocation should be repeated.

In one non-limiting embodiment, if a back-to-back-repetition would result in a transmission occupying two slots, the specific transmission occupying two slots is dropped. The other transmissions are not dropped.

In one non-limiting embodiment, the TDRA table is extended to include a field containing a DMRS presence configuration. This field indicates in which of the aggregated transmissions DMRS is present.

In another embodiment, the DMRS presence configuration field indicates the number of DMRS present in the overall aggregated transmissions. How the DMRS is present follows a certain rule, e.g., the first DMRS is present in the first repetition and the remaining is distributed evenly across repetitions. If DMRS is present in the dropped transmission according to some of the above embodiments, it may be moved to be present in the next repetition. Instead of configuring the total number of DMRS the maximum time duration (measured in absolute time or symbols or samples) between two DMRS is configured. Yet another alternative is to reuse the dmrs-UplinkForPUSCH-MappingTypeA and dmrs-UplinkForPUSCH-MappingTypeB configuration that specify the number of additional DMRS per slot.

In another embodiment, the DMRS preference configuration field indicates the presence or absence of DMRS following the mapping types in the repetitions. In the first example, entry for DMRS presence indicates that the DMRS is present in the first repetition in a frequency hop, following the Mapping Type of PUSCH or PDSCH, accordingly. However, in the following repetitions in a frequency hop, the DMRS is not present and the corresponding REs are used for data transmissions. Without frequency hopping, DMRS is present in the first repetition following the corresponding mapping type and it is not present in the following repetitions. In another example, the number of bits can be increased to the number of repetitions, to indicate for each repetition whether DMRS is present or not, based on the Mapping Type. This can be extended to apply the presence indicator to half of the repetitions, or forth of the repetitions, etc. In one non-limiting embodiment, the TDRA table is extended to include a field containing a redundancy version sequence. The redundancy version sequence indicates which transmission uses which redundancy version, repeating in a circular fashion if the length of the redundancy version sequence is shorter than the number of repetitions.

In one non-limiting embodiment, the redundancy version is chosen from either (0,0,0,0), (0,3,0,3), or (0,2,3,1).

In one non-limiting embodiment, the TDRA table is extended to include a field containing a frequency hopping indication. The frequency hopping indication indicates in which transmissions frequency hopping is performed. Alternatively, this field indicates—when set—that every other repetition is frequency-hopped while the remaining ones use the frequency allocation indicated in the DCI. In case of back-to-back repetition that stretches over multiple slots, the frequency hopping pattern may be reset at slot boundaries.

In one non-limiting embodiment, the extensions to the TDRA table are optional parameters that might not be configured. If they are not configured, then legacy Rel. 15 behavior is followed. If they are configured, the behavior is based on other embodiments in this disclosure.

In one non-limiting embodiment, the extensions to the TDRA table are optional parameters that might not be configured. Whether it is configured or not is used an implicit indicator for different repetition-based transmissions. For example, if they are configured, the back-to-back repetition is indicated where the aggregation factor is used to determine the number of repeated back-to-back transmissions. If they are not configured, other type of repetition-based transmission not requiring the aggregation factor is indicated.

Now referring to FIG. 1, an example of repetition signalling is provided. For the example shown in FIG. 1, the UE is configured with a TDRA table with an entry 110 with back-to-back transmissions of total length L occurring in two slots, where no transmission occurs over the slot border 120. The UE is further configured with a UL configured grant 130 configuration Type 2 with period P. If UE receives an activation DCI for the configured grant indicating a non-back-to-back transmission of length L and a transmission opportunity of the configured grant determined by the period P that match the entry with the back-to-back transmissions over the slot-border, the UE uses back-to-back transmission over the slot border. Hence, the UE uses non-back-to-back transmissions for the transmission occurrences of the configuration that do not cross slot-borders, but uses back-to-back transmissions for the occurrences crossing the slot-border as illustrated in FIG. 1.

According to some embodiments, it may also be beneficial to send multiple repetitions of the PDCCH. Then, if the UE misses the first PDCCH transmission, it still has a chance of decoding the remaining PDSCH repetitions if it successfully can decode the second. It then needs to know that the second PDCCH only schedules a smaller number of repetitions.

In one embodiment, another column, M, is added to the TDRA tables. Then, instead of the number of repeated transmission being defined as L, it is defined as L−(n mod M)

where n is a slot index, and M specifies the maximum number of supported PDCCH transmissions. For example, an M column of one bit will give the options M=1 or M=2. If M=2, then a PDCCH on an even-numbered slot will schedule L consecutive slots; and a PDCCH on an odd-numbered slot will schedule L−1 consecutive slots.

Take for example L=4 repetitions: If the scheduler transmits DCI in slot 0, then you have repetitions in slot 0,1,2,3, and the scheduler has the possibility to repeat DCI in slot 1; then pointing out slot 1,2,3. The cost of adding the M column is that the sequence of M repeated slots only can start on a slot fulfilling n mod M=0, which will increase the latency.

Just as previous embodiments, the PDCCH repetition can be made back-to-back with type B scheduling. The n may then specify an index of the type B scheduling (or the symbol index within the slot divided by the length of the type B scheduling).

Enhanced default TDRA tables. In some embodiments, it is assumed that the TDRA configuration is laid out in table format. In this case, adding a new field (for example, aggregation factor) means adding a new column to the TDRA table for that field. This is illustrated in the table below, where two new fields (Aggregation Factor, DMRS Presence Configuration) are added to the default PDSCH TDRA table for normal CP.

TABLE 6

Enhanced 38.214 v15.2.0, Table 5.1.2.1.1-2: Default PDSCH time domain resource allocation A for normal CP

| Row index | dmrs-TypeA-Position | PDSCH mapping type | $K_0$ | S | L | Aggregation Factor | DMRS Presence Configuration |
|---|---|---|---|---|---|---|---|
| 1 | 2 | Type A | 0 | 2 | 12 | | |
|   | 3 | Type A | 0 | 3 | 11 | | |
| 2 | 2 | Type A | 0 | 2 | 10 | | |
|   | 3 | Type A | 0 | 3 | 9 | | |
| 3 | 2 | Type A | 0 | 2 | 9 | | |
|   | 3 | Type A | 0 | 3 | 8 | | |
| 4 | 2 | Type A | 0 | 2 | 7 | | |
|   | 3 | Type A | 0 | 3 | 6 | | |
| 5 | 2 | Type A | 0 | 2 | 5 | | |
|   | 3 | Type A | 0 | 3 | 4 | | |
| 6 | 2 | Type B | 0 | 9 | 4 | | |
|   | 3 | Type B | 0 | 10 | 4 | | |
| 7 | 2 | Type B | 0 | 4 | 4 | | |
|   | 3 | Type B | 0 | 6 | 4 | | |
| 8 | 2,3 | Type B | 0 | 5 | 7 | | |
| 9 | 2,3 | Type B | 0 | 5 | 2 | | |
| 10 | 2,3 | Type B | 0 | 9 | 2 | | |
| 11 | 2,3 | Type B | 0 | 12 | 2 | | |
| 12 | 2,3 | Type A | 0 | 1 | 13 | | |
| 13 | 2,3 | Type A | 0 | 1 | 6 | | |
| 14 | 2,3 | Type A | 0 | 2 | 4 | | |
| 15 | 2,3 | Type B | 0 | 4 | 7 | | |
| 16 | 2,3 | Type B | 0 | 8 | 4 | | |

In other embodiments, TDRA of both PDSCH and PUSCH are provided via RRC signalling. Hence adding a new field means expanding the RRC configuration to include the new field. This is illustrated below for PDSCH and PUSCH TDRA configuration, respectively.

As an example, that three fields are added to PDSCH-TimeDomainResourceAllocation and PUSCH-TimeDomainResourceAllocation, as described in the table below.

TABLE 7

AggregationFactor: Number of repetitions for data. 'n1' means single transmission (i.e., no repetition), 'n2' means two repeated transmission of the same TB, etc.
DMRSPresenceConfig: DMRS presence configuration for data. 'os1' means DMRS in every OFDM symbol (or DFT-s-OFDM symbol, if configured for UL), 'os2' means DMRS in every other OFDM symbol (or DFT-s-OFDM symbol, if configured for UL), 'os3' means DMRS in every third OFDM symbol (or DFT-s-OFDM symbol, if configured for UL), etc.
RVseguence: Indication which redundancy version is used for which transmission. s1-0231 means (0,2,3,1) is used, s2-0303 means (0,3,0,3) is used, and s3-0000 means (0,0,0,0) is used.
PDSCH-TimeDomainResourceAllocationList ::= SEQUENCE (SIZE(1..maxNrofDL-Allocations)) OF PDSCH-TimeDomainResourceAllocation
PDSCH-TimeDomainResourceAllocation ::= SEQUENCE {
    k0                        INTEGER(0..32)  OPTIONAL,  -- Need S
    mappingType         ENUMERATED {typeA, typeB},
    startSymbolAndLength INTEGER (0..127),
    AggregationFactor   ENUMERATED { n1, n2, n4, n8 },
    DMRSPresenceConfig  ENUMERATED { os1, os2, os3, os4 }.
    RVsequence          ENUMERATED { s1-0231, s2-0303, s3-0000 }
}
PUSCH-TimeDomainResourceAllocationList ::= SEQUENCE (SIZE(1..maxNrofUL-Allocations)) OF PUSCH-TimeDomainResourceAllocation
PUSCH-TimeDomainResourceAllocation ::= SEQUENCE {
    k2                        INTEGER(0..32)  OPTIONAL,  -- Need S
    mappingType         ENUMERATED {typeA, typeB},
    startSymbolAndLength INTEGER (0..127)
    AggregationFactor   ENUMERATED { n1, n2, n4, n8 },
    DMRSPresenceConfig  ENUMERATED { os1, os2, os3, os4 },
    RVsequence          ENUMERATED { s1-0231, s2-0303, s3-0000 }
}
In another example, the added fields are optional:
PDSCH-TimeDomainResourceAllocationList ::= SEQUENCE (SIZE(1..maxNrofDL-Allocations)) OF PDSCH-TimeDomainResourceAllocation
PDSCH-TimeDomainResourceAllocation ::= SEQUENCE {
    k0                        INTEGER(0..32)  OPTIONAL,  -- Need S
    mappingType         ENUMERATED {typeA, typeB},
    startSymbolAndLength INTEGER (0..127),
    AggregationFactor   ENUMERATED { n1, n2, n4, n8 }  OPTIONAL,
    DMRSPresenceConfig  ENUMERAIED { os1, os2, os3, os4 }  OPTIONAL,
    RVsequence          ENUMERAIED { s1-0231, s2-0303, s3-0000}
    OPTIONAL
}
PUSCH-TimeDomainResourceAllocationList ::= SEQUENCE (SIZE(1..maxNrofUL-Allocations)) OF PUSCH-TimeDomainResourceAllocation
PUSCH-TimeDomainResourceAllocation ::= SEQUENCE {
    k2                        INTEGER(0..32)  OPTIONAL,  -- Need S
    mappingType         ENUMERATED {typeA, typeB},
    startSymbolAndLength INTEGER (0..127)
    AggregationFactor   ENUMERATED { n1, n2, n4, n8 }  OPTIONAL,
    DMRSPresenceConfig  ENUMERAIED { os1, os2, os3, os4 }  OPTIONAL,
    RVsequence          ENUMERAIED { s1-0231, s2-0303, s3-0000}
    OPTIONAL
}

In another example, the DMRSPresenceConfig field is a bitmap of length equal to the aggregation factor, where a 1 means that DMRS is present in the corresponding data transmission, and 0 means that DMRS is not present. For example, with AggregationFactor equal to n4, the bitmap '1010' means that DMRS is present in the first and third transmission, and DMRS is not present in the second and fourth transmission.

In another example, the DMRSPresenceConfig field is a bitmap of length equal to the maximum aggregation factor, where a 1 means that DMRS is present in the corresponding data transmission, and 0 means that DMRS is not present. Any bits at positions larger than the aggregation factor are ignored.

In non-limiting embodiment the invention is implemented using a "splitting factor" or "partitioning indicator" instead of an AggregationFactor. In such embodiments the "splitting factor" may indicate that a longer transmission defined by start S and length L shall be split in two or more repetitions. For example, it may indicate that the repetitions shall be e.g. 2-OS long.

Figure 2:
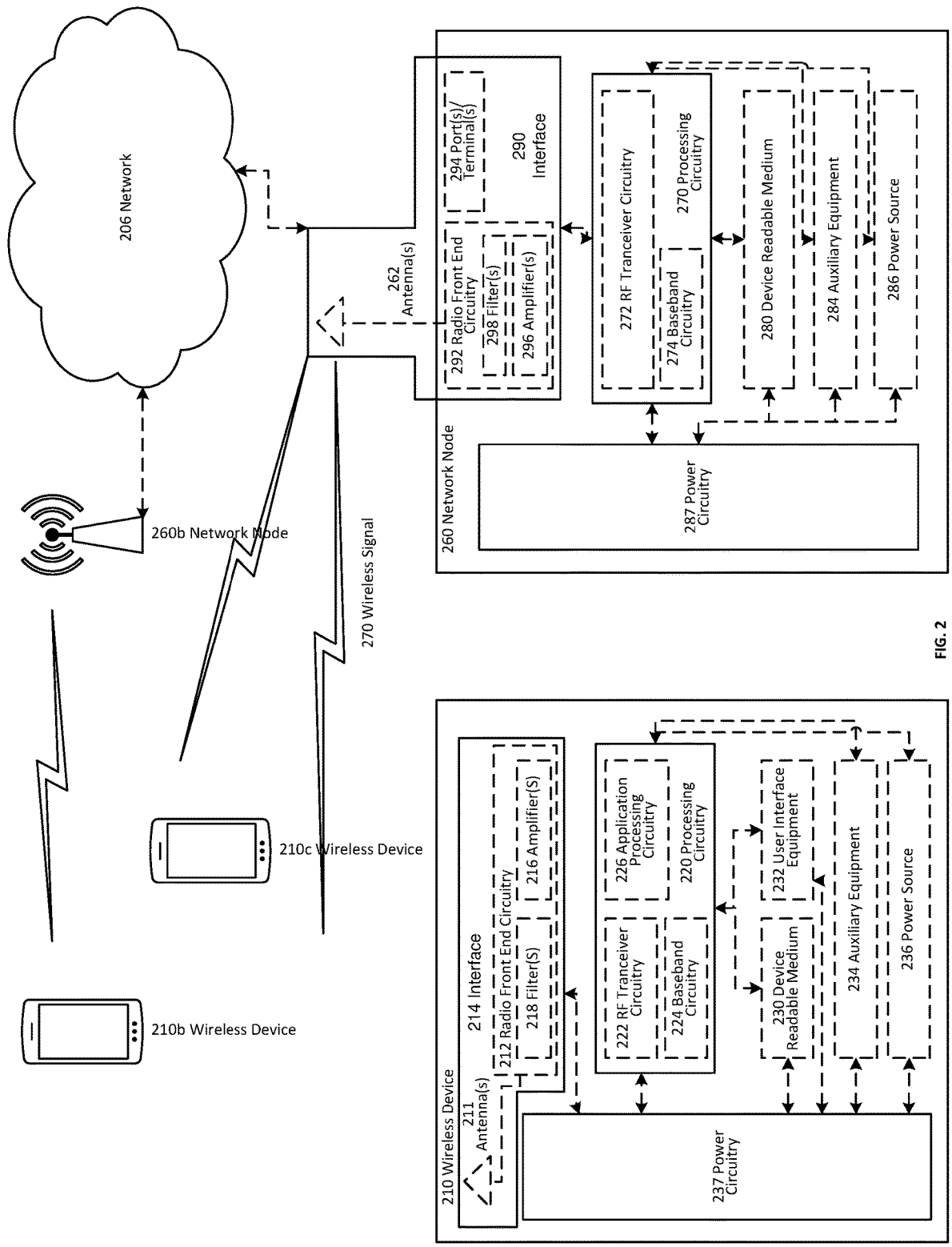
FIG. 2 is a wireless network, according to some embodiments.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 206, network nodes 260 and 260b, and WDs 210, 210b, and 210c. In practice, a wireless network may further include any additional elements suitable to support communication between wireless devices or between a wireless device and another communication device, such as a landline telephone, a service provider, or any other network node or end device. Of the illustrated components, network node 260 and wireless device (WD) 210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 260 and WD 210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 260 includes processing circuitry 270, device readable medium 280, interface 290, auxiliary equipment 284, power source 286, power circuitry 287, and antenna 262. Although network node 260 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 260 are depicted as single boxes located within a larger box, or nested within multiple boxes, in practice, a network node may comprise multiple different physical components that make up a single illustrated component (e.g., device readable medium 280 may comprise multiple separate hard drives as well as multiple RAM modules).

Similarly, network node 260 may be composed of multiple physically separate components (e.g., a NodeB component and a RNC component, or a BTS component and a BSC component, etc.), which may each have their own respective components. In certain scenarios in which network node 260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 260 may be configured to support multiple radio access technologies (RATs). In such embodiments, some components may be duplicated (e.g., separate device readable medium 280 for the different RATs) and some components may be reused (e.g., the same antenna 262 may be shared by the RATs). Network node 260 may also include multiple sets of the various illustrated components for different wireless technologies integrated into network node 260, such as, for example, GSM, WCDMA, LTE, NR, WiFi, or Bluetooth wireless technologies. These wireless technologies may be integrated into the same or different chip or set of chips and other components within network node 260.

Processing circuitry 270 is configured to perform any determining, calculating, or similar operations (e.g., certain obtaining operations) described herein as being provided by a network node. These operations performed by processing circuitry 270 may include processing information obtained by processing circuitry 270 by, for example, converting the obtained information into other information, comparing the obtained information or converted information to information stored in the network node, and/or performing one or more operations based on the obtained information or converted information, and as a result of said processing making a determination.

Processing circuitry 270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 260 components, such as device readable medium 280, network node 260 functionality. For example, processing circuitry 270 may execute instructions stored in device readable medium 280 or in memory within processing circuitry 270. Such functionality may include providing any of the various wireless features, functions, or benefits discussed herein. In some embodiments, processing circuitry 270 may include a system on a chip (SOC).

In some embodiments, processing circuitry 270 may include one or more of radio frequency (RF) transceiver circuitry 272 and baseband processing circuitry 274. In some embodiments, radio frequency (RF) transceiver circuitry 272 and baseband processing circuitry 274 may be on separate chips (or sets of chips), boards, or units, such as radio units and digital units. In alternative embodiments, part or all of RF transceiver circuitry 272 and baseband processing circuitry 274 may be on the same chip or set of chips, boards, or units In certain embodiments, some or all of the functionality described herein as being provided by a network node, base station, eNB or other such network device may be performed by processing circuitry 270 executing instructions stored on device readable medium 280 or memory within processing circuitry 270. In alternative embodiments, some or all of the functionality may be provided by processing circuitry 270 without executing instructions stored on a separate or discrete device readable medium, such as in a hard-wired manner. In any of those embodiments, whether executing instructions stored on a device readable storage medium or not, processing circuitry 270 can be configured to perform the described functionality. The benefits provided by such functionality are not limited to processing circuitry 270 alone or to other components of network node 260, but are enjoyed by network node 260 as a whole, and/or by end users and the wireless network generally.

Device readable medium 280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 270. Device readable medium 280 may store any suitable instructions, data or information, including a computer program, software, an application including one or more of logic, rules, code, tables, etc. and/or other instructions capable of being executed by processing circuitry 270 and, utilized by network node 260. Device readable medium 280 may be used to store any calculations made by processing circuitry 270 and/or any data received via interface 290. In some embodiments, processing circuitry 270 and device readable medium 280 may be considered to be integrated.

Interface 290 is used in the wired or wireless communication of signalling and/or data between network node 260, network 206, and/or WDs 210. As illustrated, interface 290 comprises port(s)/terminal(s) 294 to send and receive data, for example to and from network 206 over a wired connection. Interface 290 also includes radio front end circuitry 292 that may be coupled to, or in certain embodiments a part of, antenna 262. Radio front end circuitry 292 comprises filters 298 and amplifiers 296. Radio front end circuitry 292 may be connected to antenna 262 and processing circuitry 270. Radio front end circuitry may be configured to condition signals communicated between antenna 262 and processing circuitry 270. Radio front end circuitry 292 may receive digital data that is to be sent out to other network nodes or WDs via a wireless connection. Radio front end circuitry 292 may convert the digital data into a radio signal having the appropriate channel and bandwidth parameters using a combination of filters 298 and/or amplifiers 296. The radio signal may then be transmitted via antenna 262. Similarly, when receiving data, antenna 262 may collect radio signals which are then converted into digital data by radio front end circuitry 292. The digital data may be passed to processing circuitry 270. In other embodiments, the interface may comprise different components and/or different combinations of components.

In certain alternative embodiments, network node 260 may not include separate radio front end circuitry 292, instead, processing circuitry 270 may comprise radio front end circuitry and may be connected to antenna 262 without separate radio front end circuitry 292. Similarly, in some embodiments, all or some of RF transceiver circuitry 272 may be considered a part of interface 290. In still other embodiments, interface 290 may include one or more ports or terminals 294, radio front end circuitry 292, and RF transceiver circuitry 272, as part of a radio unit (not shown), and interface 290 may communicate with baseband processing circuitry 274, which is part of a digital unit (not shown).

Antenna 262 may include one or more antennas, or antenna arrays, configured to send and/or receive wireless signals. Antenna 262 may be coupled to radio front end circuitry 290 and may be any type of antenna capable of transmitting and receiving data and/or signals wirelessly. In some embodiments, antenna 262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 262 may be separate from network node 260 and may be connectable to network node 260 through an interface or port.

Antenna 262, interface 290, and/or processing circuitry 270 may be configured to perform any receiving operations and/or certain obtaining operations described herein as being performed by a network node. Any information, data and/or signals may be received from a wireless device, another network node and/or any other network equipment. Similarly, antenna 262, interface 290, and/or processing circuitry 270 may be configured to perform any transmitting operations described herein as being performed by a network node. Any information, data and/or signals may be transmitted to a wireless device, another network node and/or any other network equipment.

Power circuitry 287 may comprise, or be coupled to, power management circuitry and is configured to supply the components of network node 260 with power for performing the functionality described herein. Power circuitry 287 may receive power from power source 286. Power source 286 and/or power circuitry 287 may be configured to provide power to the various components of network node 260 in a form suitable for the respective components (e.g., at a voltage and current level needed for each respective component). Power source 286 may either be included in, or external to, power circuitry 287 and/or network node 260. For example, network node 260 may be connectable to an external power source (e.g., an electricity outlet) via an input circuitry or interface such as an electrical cable, whereby the external power source supplies power to power circuitry 287. As a further example, power source 286 may comprise a source of power in the form of a battery or battery pack which is connected to, or integrated in, power circuitry 287. The battery may provide backup power should the external power source fail. Other types of power sources, such as photovoltaic devices, may also be used.

Alternative embodiments of network node 260 may include additional components beyond those shown in FIG. 2 that may be responsible for providing certain aspects of the network node's functionality, including any of the functionality described herein and/or any functionality necessary to support the subject matter described herein. For example, network node 260 may include user interface equipment to allow input of information into network node 260 and to allow output of information from network node 260. This may allow a user to perform diagnostic, maintenance, repair, and other administrative functions for network node 260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 210 includes antenna 211, interface 214, processing circuitry 220, device readable medium 230, user interface equipment 232, auxiliary equipment 234, power source 236 and power circuitry 237. WD 210 may include multiple sets of one or more of the illustrated components for different wireless technologies supported by WD 210, such as, for example, GSM, WCDMA, LTE, NR, WiFi, WiMAX, or Bluetooth wireless technologies, just to mention a few. These wireless technologies may be integrated into the same or different chips or set of chips as other components within WD 210.

Antenna 211 may include one or more antennas or antenna arrays, configured to send and/or receive wireless signals, and is connected to interface 214. In certain alternative embodiments, antenna 211 may be separate from WD 210 and be connectable to WD 210 through an interface or port. Antenna 211, interface 214, and/or processing circuitry 220 may be configured to perform any receiving or transmitting operations described herein as being performed by a WD. Any information, data and/or signals may be received from a network node and/or another WD. In some embodiments, radio front end circuitry and/or antenna 211 may be considered an interface.

As illustrated, interface 214 comprises radio front end circuitry 212 and antenna 211. Radio front end circuitry 212 comprise one or more filters 218 and amplifiers 216. Radio front end circuitry 214 is connected to antenna 211 and processing circuitry 220, and is configured to condition signals communicated between antenna 211 and processing circuitry 220. Radio front end circuitry 212 may be coupled to or a part of antenna 211. In some embodiments, WD 210 may not include separate radio front end circuitry 212; rather, processing circuitry 220 may comprise radio front end circuitry and may be connected to antenna 211. Similarly, in some embodiments, some or all of RF transceiver circuitry 222 may be considered a part of interface 214. Radio front end circuitry 212 may receive digital data that is to be sent out to other network nodes or WDs via a wireless connection. Radio front end circuitry 212 may convert the digital data into a radio signal having the appropriate channel and bandwidth parameters using a combination of filters 218 and/or amplifiers 216. The radio signal may then be transmitted via antenna 211. Similarly, when receiving data, antenna 211 may collect radio signals which are then converted into digital data by radio front end circuitry 212. The digital data may be passed to processing circuitry 220. In other embodiments, the interface may comprise different components and/or different combinations of components.

Processing circuitry 220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 210 components, such as device readable medium 230, WD 210 functionality. Such functionality may include providing any of the various wireless features or benefits discussed herein. For example, processing circuitry 220 may execute instructions stored in device readable medium 230 or in memory within processing circuitry 220 to provide the functionality disclosed herein.

As illustrated, processing circuitry 220 includes one or more of RF transceiver circuitry 222, baseband processing circuitry 224, and application processing circuitry 226. In other embodiments, the processing circuitry may comprise different components and/or different combinations of components. In certain embodiments processing circuitry 220 of WD 210 may comprise a SOC. In some embodiments, RF transceiver circuitry 222, baseband processing circuitry 224, and application processing circuitry 226 may be on separate chips or sets of chips. In alternative embodiments, part or all of baseband processing circuitry 224 and application processing circuitry 226 may be combined into one chip or set of chips, and RF transceiver circuitry 222 may be on a separate chip or set of chips. In still alternative embodiments, part or all of RF transceiver circuitry 222 and baseband processing circuitry 224 may be on the same chip or set of chips, and application processing circuitry 226 may be on a separate chip or set of chips. In yet other alternative embodiments, part or all of RF transceiver circuitry 222, baseband processing circuitry 224, and application processing circuitry 226 may be combined in the same chip or set of chips. In some embodiments, RF transceiver circuitry 222 may be a part of interface 214. RF transceiver circuitry 222 may condition RF signals for processing circuitry 220.

In certain embodiments, some or all of the functionality described herein as being performed by a WD may be provided by processing circuitry 220 executing instructions stored on device readable medium 230, which in certain embodiments may be a computer-readable storage medium. In alternative embodiments, some or all of the functionality may be provided by processing circuitry 220 without executing instructions stored on a separate or discrete device readable storage medium, such as in a hard-wired manner. In any of those particular embodiments, whether executing instructions stored on a device readable storage medium or not, processing circuitry 220 can be configured to perform the described functionality. The benefits provided by such functionality are not limited to processing circuitry 220 alone or to other components of WD 210, but are enjoyed by WD 210 as a whole, and/or by end users and the wireless network generally.

Processing circuitry 220 may be configured to perform any determining, calculating, or similar operations (e.g., certain obtaining operations) described herein as being performed by a WD. These operations, as performed by processing circuitry 220, may include processing information obtained by processing circuitry 220 by, for example, converting the obtained information into other information, comparing the obtained information or converted information to information stored by WD 210, and/or performing one or more operations based on the obtained information or converted information, and as a result of said processing making a determination.

Device readable medium 230 may be operable to store a computer program, software, an application including one or more of logic, rules, code, tables, etc. and/or other instructions capable of being executed by processing circuitry 220. Device readable medium 230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 220. In some embodiments, processing circuitry 220 and device readable medium 230 may be considered to be integrated.

User interface equipment 232 may provide components that allow for a human user to interact with WD 210. Such interaction may be of many forms, such as visual, audial, tactile, etc. User interface equipment 232 may be operable to produce output to the user and to allow the user to provide input to WD 210. The type of interaction may vary depending on the type of user interface equipment 232 installed in WD 210. For example, if WD 210 is a smart phone, the interaction may be via a touch screen; if WD 210 is a smart meter, the interaction may be through a screen that provides usage (e.g., the number of gallons used) or a speaker that provides an audible alert (e.g., if smoke is detected). User interface equipment 232 may include input interfaces, devices and circuits, and output interfaces, devices and circuits. User interface equipment 232 is configured to allow input of information into WD 210, and is connected to processing circuitry 220 to allow processing circuitry 220 to process the input information. User interface equipment 232 may include, for example, a microphone, a proximity or other sensor, keys/buttons, a touch display, one or more cameras, a USB port, or other input circuitry. User interface equipment 232 is also configured to allow output of information from WD 210, and to allow processing circuitry 220 to output information from WD 210. User interface equipment 232 may include, for example, a speaker, a display, vibrating circuitry, a USB port, a headphone interface, or other output circuitry. Using one or more input and output interfaces, devices, and circuits, of user interface equipment 232, WD 210 may communicate with end users and/or the wireless network, and allow them to benefit from the functionality described herein.

Auxiliary equipment 234 is operable to provide more specific functionality which may not be generally performed by WDs. This may comprise specialized sensors for doing measurements for various purposes, interfaces for additional types of communication such as wired communications etc. The inclusion and type of components of auxiliary equipment 234 may vary depending on the embodiment and/or scenario.

Power source 236 may, in some embodiments, be in the form of a battery or battery pack. Other types of power sources, such as an external power source (e.g., an electricity outlet), photovoltaic devices or power cells, may also be used. WD 210 may further comprise power circuitry 237 for delivering power from power source 236 to the various parts of WD 210 which need power from power source 236 to carry out any functionality described or indicated herein. Power circuitry 237 may in certain embodiments comprise power management circuitry. Power circuitry 237 may additionally or alternatively be operable to receive power from an external power source; in which case WD 210 may be connectable to the external power source (such as an electricity outlet) via input circuitry or an interface such as an electrical power cable. Power circuitry 237 may also in certain embodiments be operable to deliver power from an external power source to power source 236. This may be, for example, for the charging of power source 236. Power circuitry 237 may perform any formatting, converting, or other modification to the power from power source 236 to make the power suitable for the respective components of WD 210 to which power is supplied.

Figure 3:
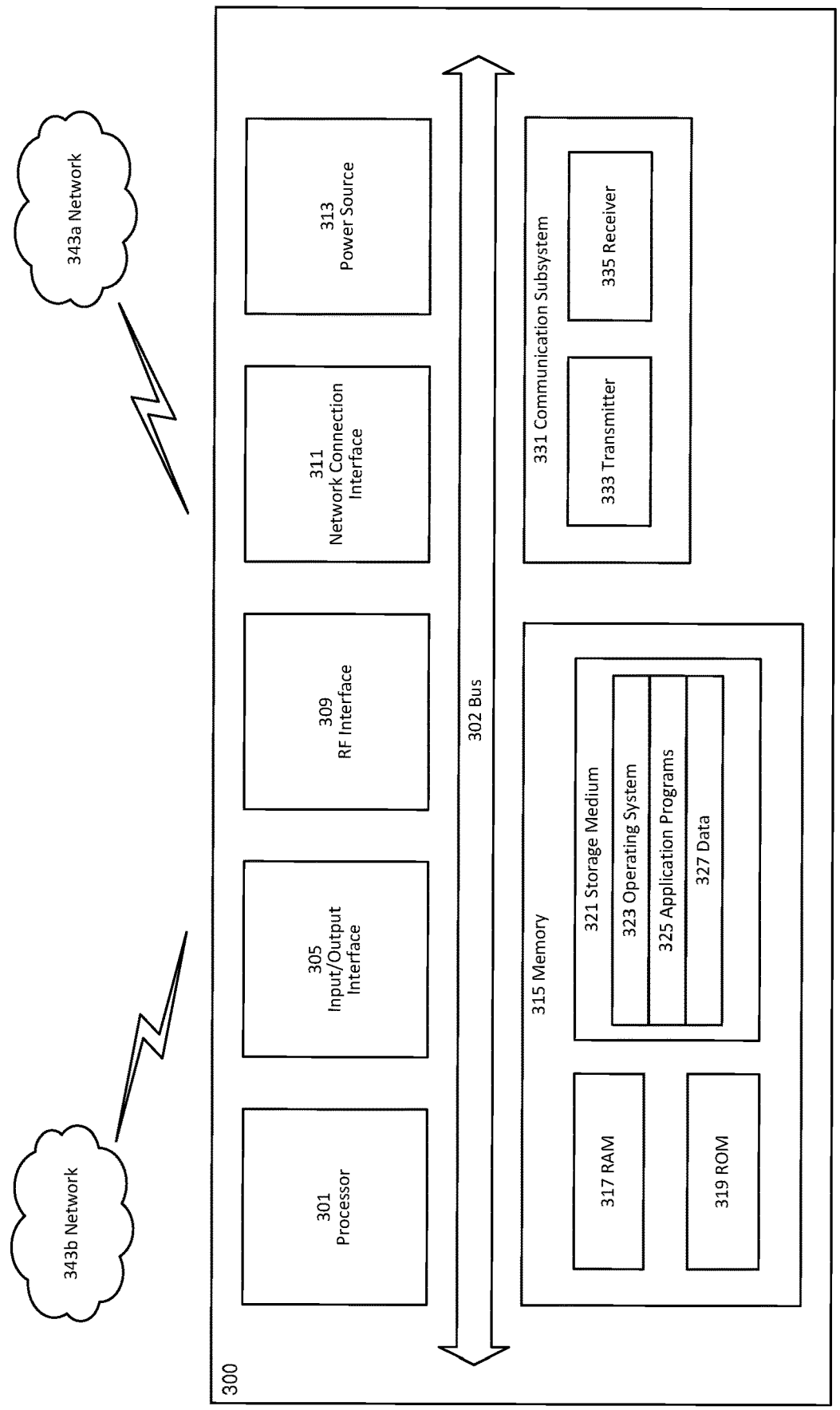
FIG. 3 is a user equipment, according to some embodiments.

FIG. 3 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 3200 may be any UE identified by the 3rd Generation Partnership Project (3GPP), including a NB-IoT UE, a machine type communication (MTC) UE, and/or an enhanced MTC (eMTC) UE. UE 300, as illustrated in FIG. 3, is one example of a WD configured for communication in accordance with one or more communication standards promulgated by the 3rd Generation Partnership Project (3GPP), such as 3GPP's GSM, UNITS, LTE, and/or 5G standards. As mentioned previously, the term WD and UE may be used interchangeable. Accordingly, although FIG. 3 is a UE, the components discussed herein are equally applicable to a WD, and vice-versa.

In FIG. 3, UE 300 includes processing circuitry 301 that is operatively coupled to input/output interface 305, radio frequency (RF) interface 309, network connection interface 311, memory 315 including random access memory (RAM) 317, read-only memory (ROM) 319, and storage medium 321 or the like, communication subsystem 331, power source 333, and/or any other component, or any combination thereof. Storage medium 321 includes operating system 323, application program 325, and data 327. In other embodiments, storage medium 321 may include other similar types of information. Certain UEs may utilize all of the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, processing circuitry 301 may be configured to process computer instructions and data. Processing circuitry 301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 301 may include two central processing units (CPUs). Data may be information in a form suitable for use by a computer.

In the depicted embodiment, input/output interface 305 may be configured to provide a communication interface to an input device, output device, or input and output device. UE 300 may be configured to use an output device via input/output interface 305. An output device may use the same type of interface port as an input device. For example, a USB port may be used to provide input to and output from UE 300. The output device may be a speaker, a sound card, a video card, a display, a monitor, a printer, an actuator, an emitter, a smartcard, another output device, or any combination thereof. UE 300 may be configured to use an input device via input/output interface 305 to allow a user to capture information into UE 300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, RF interface 309 may be configured to provide a communication interface to RF components such as a transmitter, a receiver, and an antenna. Network connection interface 311 may be configured to provide a communication interface to network 343*a*. Network 343*a* may encompass wired and/or wireless networks such as a local-area network (LAN), a wide-area network (WAN), a computer network, a wireless network, a telecommunications network, another like network or any combination thereof. For example, network 343*a* may comprise a Wi-Fi network. Network connection interface 311 may be configured to include a receiver and a transmitter interface used to communicate with one or more other devices over a communication network according to one or more communication protocols, such as Ethernet, TCP/IP, SONET, ATM, or the like. Network connection interface 311 may implement receiver and transmitter functionality appropriate to the communication network links (e.g., optical, electrical, and the like). The transmitter and receiver functions may share circuit components, software or firmware, or alternatively may be implemented separately.

RAM 317 may be configured to interface via bus 302 to processing circuitry 301 to provide storage or caching of data or computer instructions during the execution of software programs such as the operating system, application programs, and device drivers. ROM 319 may be configured to provide computer instructions or data to processing circuitry 301. For example, ROM 319 may be configured to store invariant low-level system code or data for basic system functions such as basic input and output (I/O), startup, or reception of keystrokes from a keyboard that are stored in a non-volatile memory. Storage medium 321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 321 may be configured to include operating system 323, application program 325 such as a web browser application, a widget or gadget engine or another application, and data file 327. Storage medium 321 may store, for use by UE 300, any of a variety of various operating systems or combinations of operating systems.

Storage medium 321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 321 may allow UE 300 to access computer-executable instructions, application programs or the like, stored on transitory or non-transitory memory media, to off-load data, or to upload data. An article of manufacture, such as one utilizing a communication system may be tangibly embodied in storage medium 321, which may comprise a device readable medium.

In FIG. 3, processing circuitry 301 may be configured to communicate with network 343*b* using communication subsystem 331. Network 343*a* and network 343*b* may be the same network or networks or different network or networks. Communication subsystem 331 may be configured to include one or more transceivers used to communicate with network 343*b*. For example, communication subsystem 331 may be configured to include one or more transceivers used to communicate with one or more remote transceivers of another device capable of wireless communication such as another WD, UE, or base station of a radio access network (RAN) according to one or more communication protocols, such as IEEE 802, CDMA, WCDMA, GSM, LTE, UTRAN, WiMax, or the like. Each transceiver may include transmitter 333 and/or receiver 335 to implement transmitter or receiver functionality, respectively, appropriate to the RAN links (e.g., frequency allocations and the like). Further, transmitter 333 and receiver 335 of each transceiver may share circuit components, software or firmware, or alternatively may be implemented separately.

In the illustrated embodiment, the communication functions of communication subsystem 331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 331 may include cellular communication, Wi-Fi communication, Bluetooth communication, and GPS communication. Network 343*b* may encompass wired and/or wireless networks such as a local-area network (LAN), a wide-area network (WAN), a computer network, a wireless network, a telecommunications network, another like network or any combination thereof. For example, network 343*b* may be a cellular network, a Wi-Fi network, and/or a near-field network. Power source 313 may be configured to provide alternating current (AC) or direct current (DC) power to components of UE 300.

The features, benefits and/or functions described herein may be implemented in one of the components of UE 300 or partitioned across multiple components of UE 300. Further, the features, benefits, and/or functions described herein may be implemented in any combination of hardware, software or firmware. In one example, communication subsystem 331 may be configured to include any of the components described herein. Further, processing circuitry 301 may be configured to communicate with any of such components over bus 302. In another example, any of such components may be represented by program instructions stored in memory that when executed by processing circuitry 301 perform the corresponding functions described herein. In another example, the functionality of any of such components may be partitioned between processing circuitry 301 and communication subsystem 331. In another example, the non-computationally intensive functions of any of such components may be implemented in software or firmware and the computationally intensive functions may be implemented in hardware.

Figure 4:
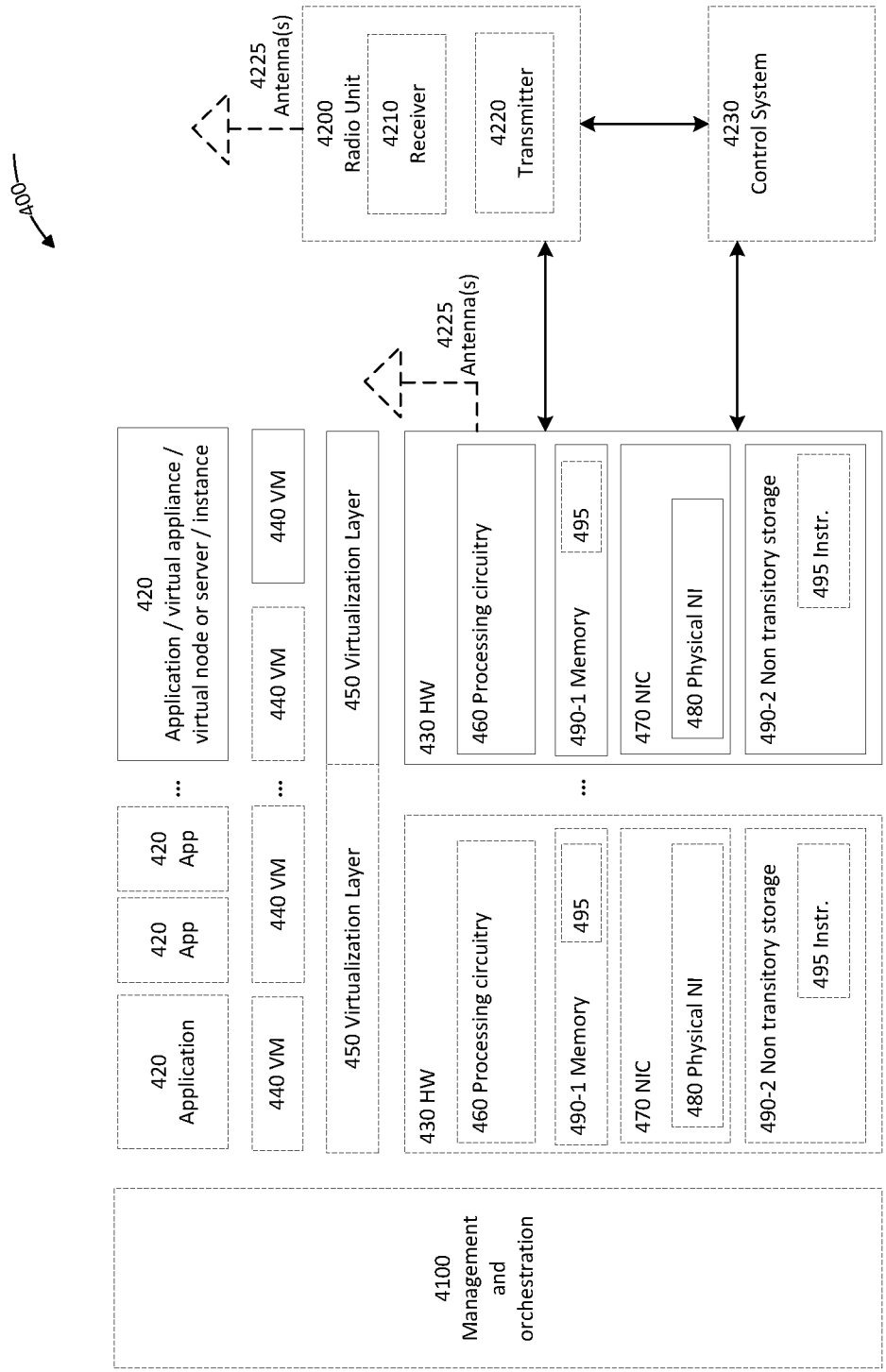
FIG. 4 is a schematic block diagram illustrating a virtualization environment, according to some embodiments.

FIG. 4 is a schematic block diagram illustrating a virtualization environment 400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 400 hosted by one or more of hardware nodes 430. Further, in embodiments in which the virtual node is not a radio access node or does not require radio connectivity (e.g., a core network node), then the network node may be entirely virtualized.

The functions may be implemented by one or more applications 420 (which may alternatively be called software instances, virtual appliances, network functions, virtual nodes, virtual network functions, etc.) operative to implement some of the features, functions, and/or benefits of some of the embodiments disclosed herein. Applications 420 are run in virtualization environment 400 which provides hardware 430 comprising processing circuitry 460 and memory 490. Memory 490 contains instructions 495 executable by processing circuitry 460 whereby application 420 is operative to provide one or more of the features, benefits, and/or functions disclosed herein.

Virtualization environment 400, comprises general-purpose or special-purpose network hardware devices 430 comprising a set of one or more processors or processing circuitry 460, which may be commercial off-the-shelf (COTS) processors, dedicated Application Specific Integrated Circuits (ASICs), or any other type of processing circuitry including digital or analog hardware components or special purpose processors. Each hardware device may comprise memory 490-1 which may be non-persistent memory for temporarily storing instructions 495 or software executed by processing circuitry 460. Each hardware device may comprise one or more network interface controllers (NICs) 470, also known as network interface cards, which include physical network interface 480. Each hardware device may also include non-transitory, persistent, machine-readable storage media 490-2 having stored therein software 495 and/or instructions executable by processing circuitry 460. Software 495 may include any type of software including software for instantiating one or more virtualization layers 450 (also referred to as hypervisors), software to execute virtual machines 440 as well as software allowing it to execute functions, features and/or benefits described in relation with some embodiments described herein.

Virtual machines 440, comprise virtual processing, virtual memory, virtual networking or interface and virtual storage, and may be run by a corresponding virtualization layer 450 or hypervisor. Different embodiments of the instance of virtual appliance 420 may be implemented on one or more of virtual machines 440, and the implementations may be made in different ways.

During operation, processing circuitry 460 executes software 495 to instantiate the hypervisor or virtualization layer 450, which may sometimes be referred to as a virtual machine monitor (VMM). Virtualization layer 450 may present a virtual operating platform that appears like networking hardware to virtual machine 440.

As shown in FIG. 4, hardware 430 may be a standalone network node with generic or specific components. Hardware 430 may comprise antenna 4225 and may implement some functions via virtualization. Alternatively, hardware 430 may be part of a larger cluster of hardware (e.g. such as in a data center or customer premise equipment (CPE)) where many hardware nodes work together and are managed via management and orchestration (MANO) 4100, which, among others, oversees lifecycle management of applications 420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 440 may be a software implementation of a physical machine that runs programs as if they were executing on a physical, non-virtualized machine. Each of virtual machines 440, and that part of hardware 430 that executes that virtual machine, be it hardware dedicated to that virtual machine and/or hardware shared by that virtual machine with others of the virtual machines 440, forms a separate virtual network elements (VNE).

Still in the context of NFV, Virtual Network Function (VNF) is responsible for handling specific network functions that run in one or more virtual machines 440 on top of hardware networking infrastructure 430 and corresponds to application 420 in FIG. 4.

In some embodiments, one or more radio units 4200 that each include one or more transmitters 4220 and one or more receivers 4210 may be coupled to one or more antennas 4225. Radio units 4200 may communicate directly with hardware nodes 430 via one or more appropriate network interfaces and may be used in combination with the virtual components to provide a virtual node with radio capabilities, such as a radio access node or a base station.

In some embodiments, some signalling can be effected with the use of control system 4230 which may alternatively be used for communication between the hardware nodes 430 and radio units 4200.

Figure 5:
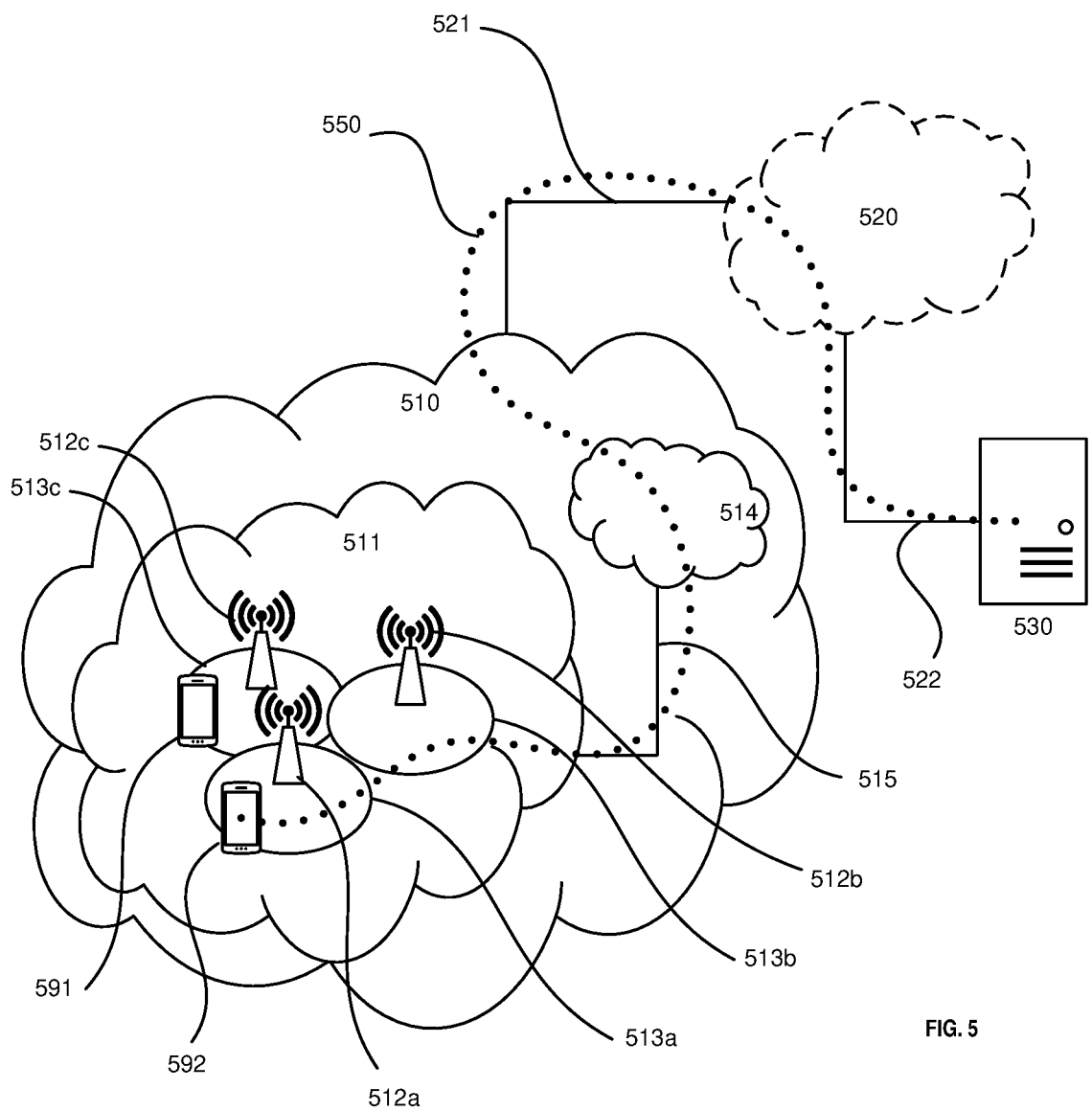
FIG. 5 is a communication system, according to some embodiments.

With reference to FIG. 5, a communication system in accordance with an embodiment is shown. The illustrated communication system includes telecommunication network 510, such as a 3GPP-type cellular network, which comprises access network 511, such as a radio access network, and core network 514. Access network 511 comprises a plurality of base stations 512a, 512b, 512c, such as NBs, eNBs, gNBs or other types of wireless access points, each defining a corresponding coverage area 513a, 513b, 513c. Each base station 512a, 512b, 512c is connectable to core network 514 over a wired or wireless connection 515. A first UE 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512.

Telecommunication network 510 is itself connected to host computer 530, which may be embodied in the hardware and/or software of a standalone server, a cloud-implemented server, a distributed server or as processing resources in a server farm. Host computer 530 may be under the ownership or control of a service provider, or may be operated by the service provider or on behalf of the service provider. Connections 521 and 522 between telecommunication network 510 and host computer 530 may extend directly from core network 514 to host computer 530 or may go via an optional intermediate network 520. Intermediate network 520 may be one of, or a combination of more than one of, a public, private or hosted network; intermediate network 520, if any, may be a backbone network or the Internet; in particular, intermediate network 520 may comprise two or more sub-networks (not shown).

The communication system of FIG. 5 as a whole enables connectivity between the connected UEs 591, 592 and host computer 530. The connectivity may be described as an over-the-top (OTT) connection 550. Host computer 530 and the connected UEs 591, 592 are configured to communicate data and/or signalling via OTT connection 550, using access network 511, core network 514, any intermediate network 520 and possible further infrastructure (not shown) as intermediaries. OTT connection 550 may be transparent in the sense that the participating communication devices through which OTT connection 550 passes are unaware of routing of uplink and downlink communications. For example, base station 512 may not or need not be informed about the past routing of an incoming downlink communication with data originating from host computer 530 to be forwarded (e.g., handed over) to a connected UE 591. Similarly, base station 512 need not be aware of the future routing of an outgoing uplink communication originating from the UE 591 towards the host computer 530.

Example implementations, in accordance with an embodiment, of the UE, base station and host computer discussed in the preceding paragraphs will now be described with reference to FIG. 6. In communication system 600, host computer 610 comprises hardware 615 including communication interface 616 configured to set up and maintain a wired or wireless connection with an interface of a different communication device of communication system 600. Host computer 610 further comprises processing circuitry 618, which may have storage and/or processing capabilities. In particular, processing circuitry 618 may comprise one or more programmable processors, application-specific integrated circuits, field programmable gate arrays or combinations of these (not shown) adapted to execute instructions. Host computer 610 further comprises software 611, which is stored in or accessible by host computer 610 and executable by processing circuitry 618. Software 611 includes host application 612. Host application 612 may be operable to provide a service to a remote user, such as UE 630 connecting via OTT connection 650 terminating at UE 630 and host computer 610. In providing the service to the remote user, host application 612 may provide user data which is transmitted using OTT connection 650.

Communication system 600 further includes base station 620 provided in a telecommunication system and comprising hardware 625 enabling it to communicate with host computer 610 and with UE 630. Hardware 625 may include communication interface 626 for setting up and maintaining a wired or wireless connection with an interface of a different communication device of communication system 600, as well as radio interface 627 for setting up and maintaining at least wireless connection 670 with UE 630 located in a coverage area (not shown in FIG. 6) served by base station 620. Communication interface 626 may be configured to facilitate connection 660 to host computer 610. Connection 660 may be direct or it may pass through a core network (not shown in FIG. 6) of the telecommunication system and/or through one or more intermediate networks outside the telecommunication system. In the embodiment shown, hardware 625 of base station 620 further includes processing circuitry 628, which may comprise one or more programmable processors, application-specific integrated circuits, field programmable gate arrays or combinations of these (not shown) adapted to execute instructions. Base station 620 further has software 621 stored internally or accessible via an external connection.

Communication system 600 further includes UE 630 already referred to. Its hardware 635 may include radio interface 637 configured to set up and maintain wireless connection 670 with a base station serving a coverage area in which UE 630 is currently located. Hardware 635 of UE 630 further includes processing circuitry 638, which may comprise one or more programmable processors, application-specific integrated circuits, field programmable gate arrays or combinations of these (not shown) adapted to execute instructions. UE 630 further comprises software 631, which is stored in or accessible by UE 630 and executable by processing circuitry 638. Software 631 includes client application 632. Client application 632 may be operable to provide a service to a human or non-human user via UE 630, with the support of host computer 610. In host computer 610, an executing host application 612 may communicate with the executing client application 632 via OTT connection 650 terminating at UE 630 and host computer 610. In providing the service to the user, client application 632 may receive request data from host application 612 and provide user data in response to the request data. OTT connection 650 may transfer both the request data and the user data. Client application 632 may interact with the user to generate the user data that it provides.

Figure 6:
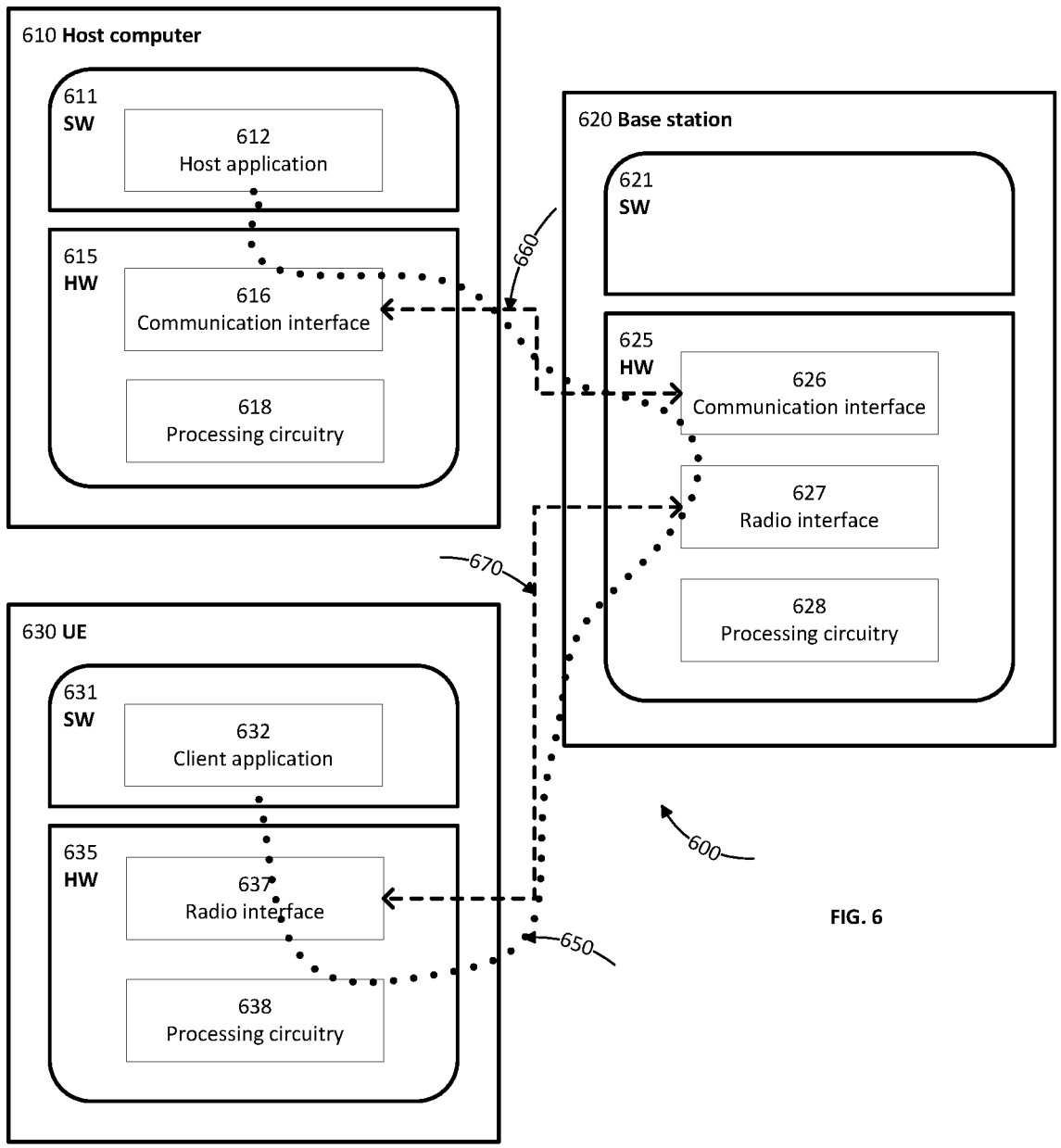
FIG. 6 illustrates example implementations of a user equipment, base station, and host computer, according to some embodiments.

It is noted that host computer 610, base station 620 and UE 630 illustrated in FIG. 6 may be similar or identical to host computer 530, one of base stations 512a, 512b, 512c and one of UEs 591, 592 of FIG. 5, respectively. This is to say, the inner workings of these entities may be as shown in FIG. 6 and independently, the surrounding network topology may be that of FIG. 5.

In FIG. 6, OTT connection 650 has been drawn abstractly to illustrate the communication between host computer 610 and UE 630 via base station 620, without explicit reference to any intermediary devices and the precise routing of messages via these devices. Network infrastructure may determine the routing, which it may be configured to hide from UE 630 or from the service provider operating host computer 610, or both. While OTT connection 650 is active, the network infrastructure may further take decisions by which it dynamically changes the routing (e.g., on the basis of load balancing consideration or reconfiguration of the network).

Wireless connection 670 between UE 630 and base station 620 is in accordance with the teachings of the embodiments described throughout this disclosure. One or more of the various embodiments improve the performance of OTT services provided to UE 630 using OTT connection 650, in which wireless connection 670 forms the last segment. More precisely, the teachings of these embodiments may improve the latency and reliability and thereby provide benefits such as reduced user waiting time, relaxed restriction on file size, better responsiveness, etc.

A measurement procedure may be provided for the purpose of monitoring data rate, latency and other factors on which the one or more embodiments improve. There may further be an optional network functionality for reconfiguring OTT connection 650 between host computer 610 and UE 630, in response to variations in the measurement results. The measurement procedure and/or the network functionality for reconfiguring OTT connection 650 may be implemented in software 611 and hardware 615 of host computer 610 or in software 631 and hardware 635 of UE 630, or both. In embodiments, sensors (not shown) may be deployed in or in association with communication devices through which OTT connection 650 passes; the sensors may participate in the measurement procedure by supplying values of the monitored quantities exemplified above, or supplying values of other physical quantities from which software 611, 631 may compute or estimate the monitored quantities. The reconfiguring of OTT connection 650 may include message format, retransmission settings, preferred routing etc.; the reconfiguring need not affect base station 620, and it may be unknown or imperceptible to base station 620. Such procedures and functionalities may be known and practiced in the art. In certain embodiments, measurements may involve proprietary UE signalling facilitating host computer 610's measurements of throughput, propagation times, latency and the like. The measurements may be implemented in that software 611 and 631 causes messages to be transmitted, in particular empty or 'dummy' messages, using OTT connection 650 while it monitors propagation times, errors etc.

Figure 7:
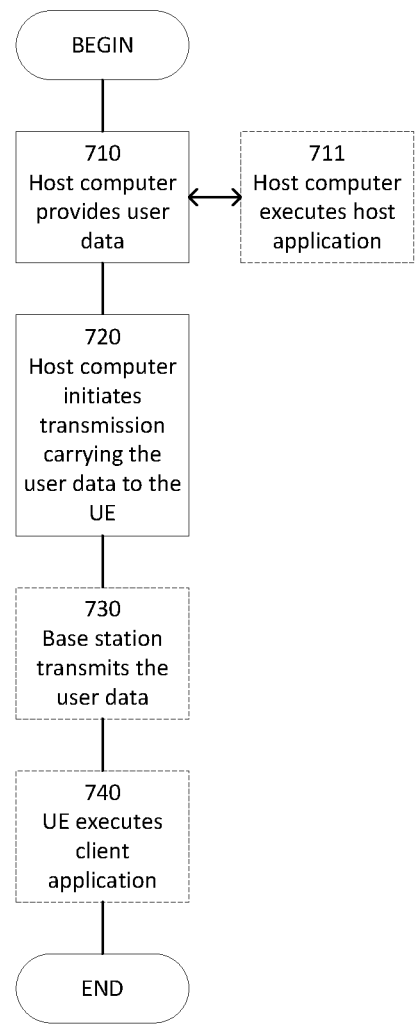
FIG. 7 is a flowchart illustrating a method implemented in a communication system, according to some embodiments.

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In step 710, the host computer provides user data. In substep 711 (which may be optional) of step 710, the host computer provides the user data by executing a host application. In step 720, the host computer initiates a transmission carrying the user data to the UE. In step 730 (which may be optional), the base station transmits to the UE the user data which was carried in the transmission that the host computer initiated, in accordance with the teachings of the embodiments described throughout this disclosure. In step 740 (which may also be optional), the UE executes a client application associated with the host application executed by the host computer.

Figure 8:
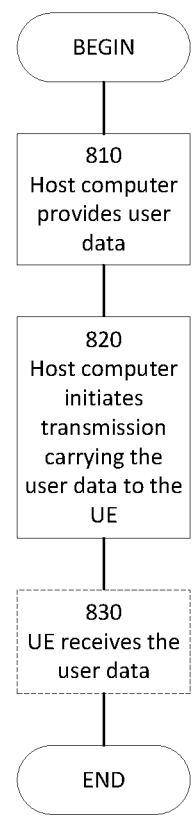
FIG. 8 is a flowchart illustrating a method implemented in a communication system, according to some embodiments.

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In step 810 of the method, the host computer provides user data. In an optional substep (not shown) the host computer provides the user data by executing a host application. In step 820, the host computer initiates a transmission carrying the user data to the UE. The transmission may pass via the base station, in accordance with the teachings of the embodiments described throughout this disclosure. In step 830 (which may be optional), the UE receives the user data carried in the transmission.

Figure 9:
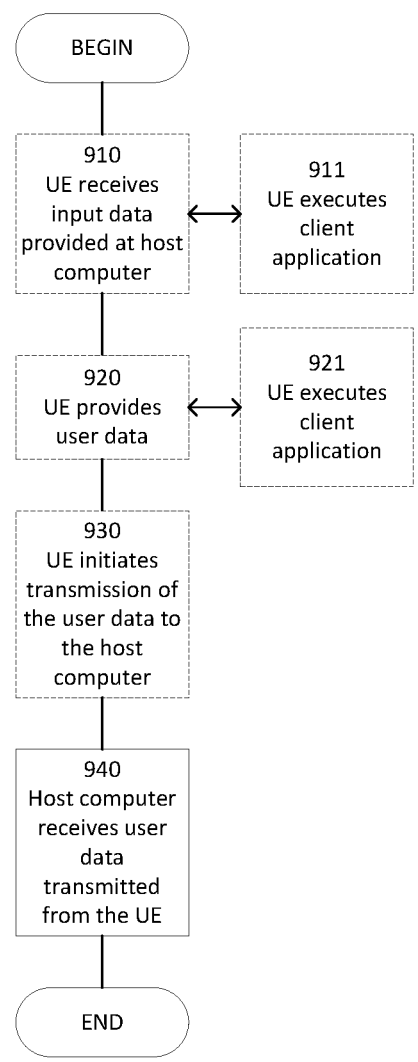
FIG. 9 is a flowchart illustrating a method implemented in a communication system, according to some embodiments.

FIG. 9 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 9 will be included in this section. In step 910 (which may be optional), the UE receives input data provided by the host computer. Additionally or alternatively, in step 920, the UE provides user data. In substep 921 (which may be optional) of step 920, the UE provides the user data by executing a client application. In substep 911 (which may be optional) of step 910, the UE executes a client application which provides the user data in reaction to the received input data provided by the host computer. In providing the user data, the executed client application may further consider user input received from the user. Regardless of the specific manner in which the user data was provided, the UE initiates, in substep 930 (which may be optional), transmission of the user data to the host computer. In step 940 of the method, the host computer receives the user data transmitted from the UE, in accordance with the teachings of the embodiments described throughout this disclosure.

Figure 10:
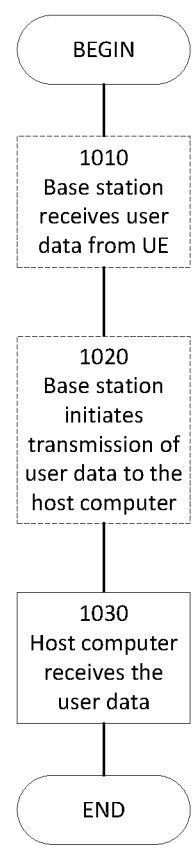
FIG. 10 is a flowchart illustrating a method implemented in a communication system, according to some embodiments.

FIG. 10 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 10 will be included in this section. In step 1010 (which may be optional), in accordance with the teachings of the embodiments described throughout this disclosure, the base station receives user data from the UE. In step 1020 (which may be optional), the base station initiates transmission of the received user data to the host computer. In step 1030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 11:
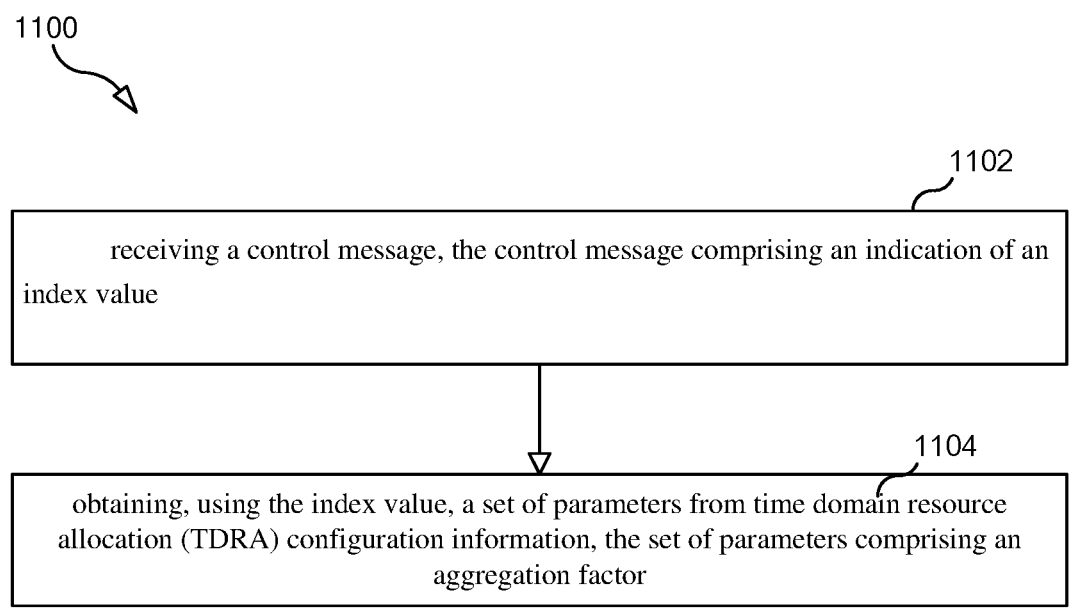
FIG. 11 is a flow diagram for repetition signalling, according to some embodiments.

FIG. 11 is a flow diagram for repetition signalling according to some embodiments. In some embodiments, the method 1100 of FIG. 11 is performed by a wireless device or UE for repetition signalling. At step 1102, the WD receives a control message, the control message comprising an indication of an index value. For example, in some embodiments, the control message is downlink control information (DCI) transmitted on a physical downlink control channel (PDCCH), a configuration message transmitted on radio resource control (RRC), or a combination of DCI transmitted on PDCCH and a configuration message transmitted on RRC. At step 1104, the WD obtains, using the index value, a set of parameters from TDRA configuration information, the set of parameters comprising an aggregation factor. For example, as described above, the TDRA configuration information may be comprise a default TDRA table as described above or TDRA configuration configured via RRC.

Figure 12:
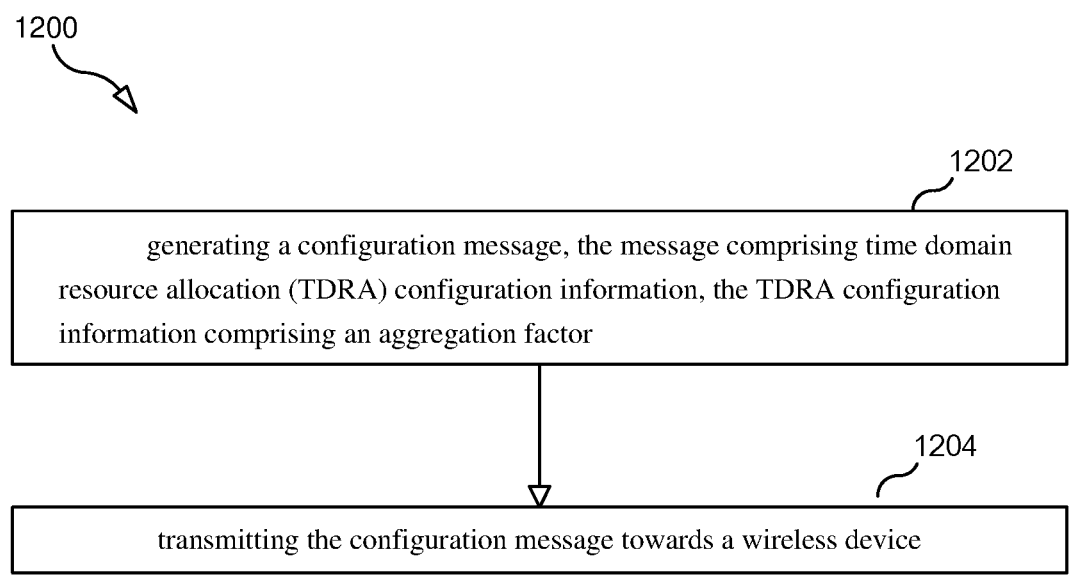
FIG. 12 is a flow diagram for repetition signalling, according to some embodiments.

FIG. 12 is a flow diagram for repetition signalling according to some embodiments. In some embodiments, the method 1200 of FIG. 12 is performed by a base station for repetition signalling. At step 1202, the base station generates a configuration message, the message comprising TDRA configuration information, the TDRA configuration comprising an aggregation factor. At step 1204, the base station transmits the configuration message towards a wireless device.

Figure 13:
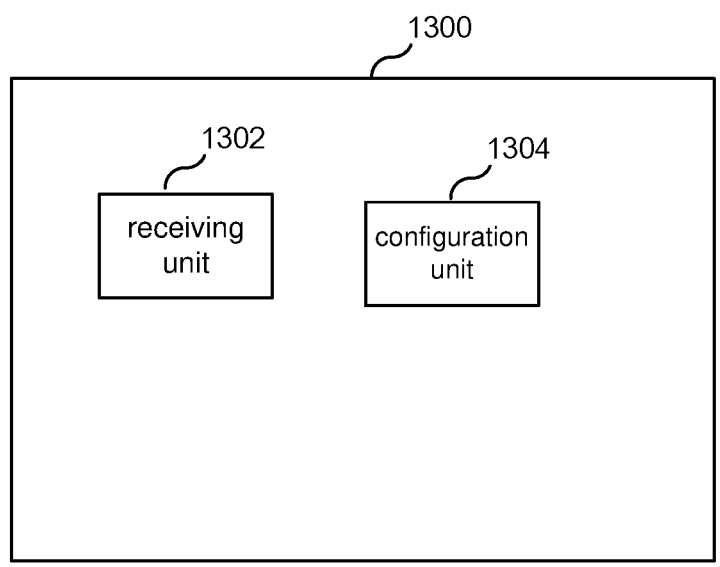
FIG. 13 is a schematic block diagram of an apparatus, according to some embodiments.
Figure 14:
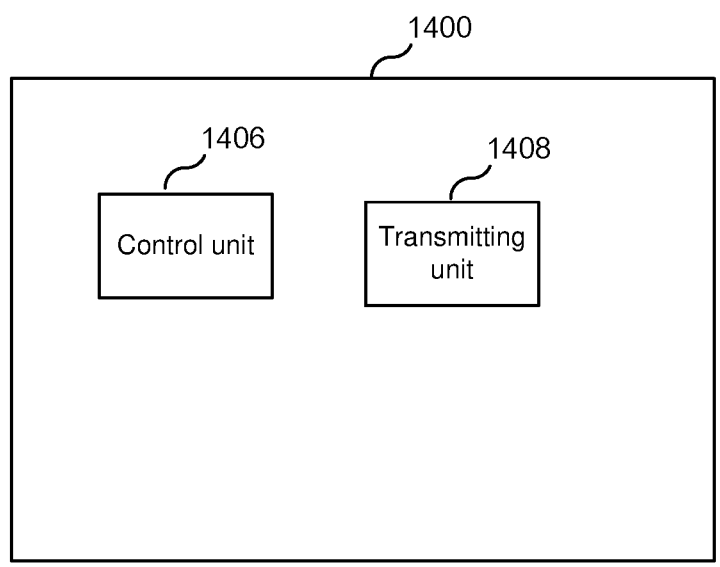
FIG. 14 is a schematic block diagram of an apparatus, according to some embodiments.

FIGS. 13-14 illustrate a schematic block diagram of an apparatus 1300, 1400 in a wireless network (for example, the wireless network shown in FIG. 2). The apparatus may be implemented in a wireless device or network node (e.g., wireless device 210 or network node 260 shown in FIG. 2). Apparatus 1300, 1400 is operable to carry out the example methods described with reference to FIGS. 11 and 12 and possibly any other processes or methods disclosed herein. It is also to be understood that the methods of FIGS. 11 and 12 is not necessarily carried out solely by apparatus 1300, 1400. At least some operations of the method can be performed by one or more other entities.

Virtual Apparatus 1300, 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a receiving unit 1302, a configuration unit 1304, a control unit 1406, a transmitting unit 1408 and/or any other suitable units of apparatus 1300, 1400 to perform corresponding functions according one or more embodiments of the present disclosure.

As illustrated in FIG. 13, apparatus 1300 includes a receiving unit 1302 configured to receive a control message, the control message comprising an indication of an index value, and a configuration unit 1304 configured to obtain, using the index value, a set of parameters from TDRA configuration information, the set of parameters comprising an aggregation factor.

As illustrated in FIG. 14, apparatus 1400 includes a control unit 1406 configured to generate a configuration message, the message comprising time domain resource allocation (TDRA) configuration information, the TDRA configuration information comprising an aggregation factor, and a transmitting unit 1408 configured to transmit the configuration message towards a wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments—UE

A1. A method performed by a wireless device for repetition signalling, the method comprising at least one of:

receiving a control message, the control message comprising an indication of an index value; obtaining, using the index value, a set of parameters from time domain resource allocation (TDRA) configuration information, the set of parameters comprising an aggregation factor.

A2. The method of embodiment 1, wherein the TDRA configuration information is arranged in a table with a plurality of rows, and the step of obtaining the set of parameters comprises at least one of: identifying a row in the table corresponding to the index value; and obtaining the set of parameters from the identified row in the table.

A3. The method of any of the previous embodiments, wherein the TDRA configuration information comprises a physical uplinked shared channel (PUSCH) TDRA configuration, and the set of parameters further comprises a slot offset, a start symbol, an allocation length, and a PUSCH mapping type.

A4. The method of any of embodiments 1-2, wherein the TDRA configuration information comprises a physical uplinked shared channel (PUSCH) TDRA configuration, and the set of parameters further comprises a slot offset, a start and length indicator variable, and a PUSCH mapping type.

A5. The method of any of the previous embodiments, wherein the set of parameters further comprises an indication to use at least one of slot aggregation or back-to-back repetition of transmissions in accordance with the aggregation factor.

A6. The method of embodiment 5, wherein the indication to use at least one of slot aggregation or back-to-back repetition specifies to use slot aggregation for a first set of transmission durations and back-to-back for a second set of transmission durations.

A7. The method of embodiment 5, wherein the indication to use at least one of slot aggregation or back-to-back repetition further specifies to use slot aggregation for a first type of scheduling and back-to-back for a second type of scheduling.

A8. The method of any of embodiments 5-7, further comprising at least one of: determining that using back-to-back repetition with the aggregation factor would result in a first transmission occupying a first slot and at least one transmission at least partly occupying a second slot different than the first slot; as a result of the determining, determining not to transmit the at least one transmission at least partly occupying the second slot.

A9. The method of any of embodiments 5-7, further comprising at least one of: determining that using back-to-back repetition with the aggregation factor would result in a first transmission occupying a first slot and a second transmission at least partly occupying a second slot different than the first slot; as a result of the determining, shortening the second transmission such that it no longer at least partly occupies the second slot.

A10. The method of any of the previous embodiments, further comprising: transmitting a message using the obtained set of parameters from the TDRA configuration information.

A11. The method of any of the previous embodiments, wherein the aggregation factor indicates a number of individual repetitions, the method further comprising at least one of: determining that a back-to-back repetition according to the number of individual repetitions results in a transmission occupying two slots; determining not to transmit the transmission occupying two slots.

A12. The method of any of the previous embodiments, wherein the TDRA configuration information comprises a physical downlink shared channel (PDSCH) TDRA configuration, and the set of parameters further comprises a slot offset, a start symbol, an allocation length, and a PDSCH mapping type.

A13. The method of any of embodiments 1-11, wherein the TDRA configuration information is a physical downlink shared channel (PDSCH) TDRA configuration, and the set of parameters further comprises a slot offset, a start and length indicator variable, and a PDSCH mapping type.

A14. The method of any of the previous embodiments, further comprising: receiving a message in accordance with the obtained set of parameters from the TDRA configuration information A15. The method of any of the previous embodiments, wherein the aggregation factor indicates a number of slots over which a resource allocation should be repeated, the method further comprising: for each slot of the number slots, repeating the resource allocation back-to-back as often as possible without crossing a boundary of the slot.

A15-1. The method of embodiment 15, wherein the resource allocation is a frequency domain resource allocation.

A16. The method of any of the previous embodiments, further comprising at least one of: determining that a back-to-back repetition with the aggregation factor would result in a first transmission occupying a first slot and at least one transmission at least partly occupying a second slot different than the first slot; as a result of the determining, determining not receiving the at least one transmission at least partly occupying the second slot.

A17. The method of any of the previous embodiments, further comprising at least one of: determining that a back-to-back repetition with the aggregation factor would result in a first transmission occupying a first slot and a second transmission at least partly occupying a second slot different than the first slot; as a result of the determining, receiving a shortened second transmission such that the shortened second transmission no longer at least partly occupies the second slot.

A18. The method of any of the previous embodiments, wherein the aggregation factor indicates a number of individual repetitions, the method further comprising the step of: determining that a back-to-back repetition according to the number of individual repetitions results in a transmission occupying two slots; determining not to receive the transmission occupying two slots.

A19. The method of any of the previous embodiments, wherein the set of parameters further comprise a DeModulation Reference Signal (DMRS) presence configuration, the DMRS presence configuration indicating in which of an aggregated transmission a DMRS is present.

A20. The method of embodiment 19, wherein the DMRS presence configuration further indicates a number of DMRS present in a set of aggregated transmissions.

A21. The method of any of embodiments 1-19, wherein the DMRS presence configuration further indicates a presence or absence of DMRS following a mapping type in a repetition.

A22. The method of any of the previous embodiments, wherein the set of parameters further comprises a redundancy version sequence.

A23. The method of any of the previous embodiments, wherein the set of parameters further comprises a frequency hopping indication.

A24. The method of any of the previous embodiments, wherein the control message is (i) downlink control information (DCI) transmitted on a physical downlink control channel (PDCCH), (ii) a configuration message transmitted on radio resource control (RRC), or (iii) a combination of DCI transmitted on PDCCH and a configuration message transmitted on RRC.

A25. The method of any of the previous embodiments, wherein the aggregation factor is an optional parameter, further comprising: determining that the aggregation factor is not configured. in the TDRA configuration information.

A26. The method of any of the previous embodiments, wherein the set of parameters further comprises an indication of a maximum number of supported physical downlink control channel (PDCCH) transmissions(M), further comprising: determining a number of repeated transmissions by calculating L−(n mod M), where L is an allocation length and n is a slot index value.

A27. The method of any of the previous embodiments, wherein the aggregation factor is a splitting factor or partitioning indicator indicating that a transmission defined by a start S and length L shall be split in two or more repetitions.

Group B Embodiments—Base Station

B1. A method performed by a base station for repetition signalling, the method comprising at least one of: generating a configuration message, the message comprising time domain resource allocation (TDRA) configuration information, the TDRA configuration information comprising an aggregation factor; and, transmitting the configuration message towards a wireless device.

B2. The method of embodiment 1, wherein the TDRA configuration information comprises a physical uplinked shared channel (PUSCH) TDRA configuration, and the TDRA configuration comprises a slot offset, a start symbol, an allocation length, and a PUSCH mapping type.

B3. The method of embodiment 1, wherein the TDRA configuration information comprises a physical uplinked shared channel (PUSCH) TDRA configuration, and the set of parameters further comprises a slot offset, a start and length indicator variable, and a PUSCH mapping type.

B4. The method of any of the previous embodiments, wherein the TDRA configuration information further comprises an indication for the wireless device to use at least one of slot aggregation or back-to-back repetition for sending transmissions to the base station in accordance with the aggregation factor.

B5. The method of embodiment 4, wherein the indication to use at least one of slot aggregation or back-to-back repetition specifies to the wireless device to use slot aggregation for a first set of transmission durations and back-to-back for a second set of transmission durations.

B6. The method of embodiment 5, wherein the indication to use at least one of slot aggregation or back-to-back repetition further specifies to the wireless device to use slot aggregation for a first type of scheduling and back-to-back for a second type of scheduling.

B7. The method of any of the previous embodiments, further comprising: receiving a message transmitted from the wireless device in accordance with the TDRA configuration information.

B7-1. The method of any of the previous embodiments, further comprising at least one of: determining that using back-to-back repetition with the aggregation factor would result in a first transmission occupying a first slot and at least one transmission at least partly occupying a second slot different than the first slot; as a result of the determining, determining not to receive the at least one transmission at least partly occupying the second slot.

B7-2. The method of any of the previous embodiments, further comprising at least one of: determining that using back-to-back repetition with the aggregation factor would result in a first transmission occupying a first slot and a second transmission at least partly occupying a second slot different than the first slot; as a result of the determining, receiving a shortened second transmission such that the shortened second transmission no longer at least partly occupies the second slot.

B7-3. The method of any of the previous embodiments, wherein the aggregation factor indicates a number of individual repetitions, the method further comprising at least one of: determining that a back-to-back repetition according to the number of individual repetitions results in a transmission occupying two slots; determining not to receive the transmission occupying two slots.

B8. The method of any of the previous embodiments, wherein the TDRA configuration information comprises a physical downlink shared channel (PDSCH) TDRA configuration, and the set of parameters further comprises a slot offset, a start symbol, an allocation length, and a PDSCH mapping type.

B9. The method of any of embodiments 1-7, wherein the TDRA configuration information comprises a physical downlink shared channel (PDSCH) TDRA configuration, and the set of parameters further comprises a slot offset, a start and length indicator variable, and a PDSCH mapping type.

B10. The method of any of the previous embodiments, further comprising at least one of: determining that using back-to-back repetition with the aggregation factor would result in a first transmission occupying a first slot and at least one transmission at least partly occupying a second slot different than the first slot; as a result of the determining, determining not to transmit the at least one transmission at least partly occupying the second slot.

B11. The method of any of the previous embodiments, further comprising at least one of: determining that using back-to-back repetition with the aggregation factor would result in a first transmission occupying a first slot and a second transmission at least partly occupying a second slot different than the first slot; as a result of the determining, shortening the second transmission such that it no longer at least partly occupies the second slot.

B12. The method of any of the previous embodiments, further comprising at least one of: transmitting a message in accordance with the TDRA configuration information.

B13. The method of any of the previous embodiments, wherein the aggregation factor indicates a number of individual repetitions, the method further comprising: determining that a back-to-back repetition according to the number of individual repetitions results in a transmission occupying two slots; determining not to transmit the transmission occupying two slots.

B14. The method of any of the previous embodiments, wherein the aggregation factor indicates a number of slots over which a resource allocation should be repeated, the method further comprising: for each slot of the number slots, repeating the resource allocation back-to-back as often as possible without crossing a boundary of the slot.

B14-1. The method of embodiment 1, wherein the resource allocation is a frequency domain resource allocation.

B15. The method of any of the previous embodiments, wherein the TDRA configuration information further comprises a DMRS presence configuration, the DMRS presence configuration indicating in which of an aggregated transmission a DMRS is present.

B16. The method of embodiment 15, wherein the DMRS presence configuration further indicates (i) a number of DMRS present in a set of aggregated transmissions or (ii) a presence or absence of DMRS following a mapping type in a repetition.

B17. The method of any of embodiments 15-16, wherein the DMRS presence configuration comprises a bitmap of a length equal to the aggregation factor.

B18. The method of any of the previous embodiments, wherein the set of parameters further comprises a redundancy version sequence.

B19. The method of any of the previous embodiments, wherein the set of parameters further comprises a frequency hopping indication.

B20. The method of any of the previous embodiments, wherein the configuration message is (i) downlink control information (DCI) transmitted on a physical downlink control channel (PDCCH), (ii) a configuration message transmitted on radio resource control (RRC), or (iii) a combination of DCI transmitted on PDCCH and a configuration message transmitted on RRC.

B21. The method of any of the previous embodiments, wherein the aggregation factor is an optional parameter.

B22. The method of any of the previous embodiments, wherein the TDRA configuration further comprises an indication of a maximum number of supported physical downlink control channel (PDCCH) transmissions(M), wherein a number of repeated transmissions is calculated according to L−(n mod M), where L is an allocation length and n is a slot index value.

B23. The method of any of the previous embodiments, wherein the aggregation factor is a splitting factor or partitioning indicator indicating that a transmission defined by a start S and length L shall be split in two or more repetitions.

Group C Embodiments

C1. A wireless device for repetition signalling, the wireless device comprising: processing circuitry configured to perform any of the steps of any of the Group A embodiments.

C2. A base station for repetition signalling, the base station comprising: processing circuitry configured to perform any of the steps of any of the Group B embodiments.

C3. A user equipment (UE) for repetition signalling, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3 GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/NoCPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERANGSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFNMultimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCHPhysical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACHPhysical Random Access Channel
PRS Positioning Reference Signal
PSS Primary Synchronization Signal
PUCCHPhysical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRANUniversal Terrestrial Radio Access Network
WCDMA Wide CDMA
WLAN Wide Local Area Network
The following text comprises the appendix from the provisional.

APPENDIX

Enhancements to Uplink and Downlink Physical Channels for NR URLLC

INTRODUCTION

In June 2018's RAN Plenary meeting, the eURLLC study item [00415] was approved. The objective of the study item is to study reliability and latency performance supported by NR Rel. 15 and identify further enhancements if needed to achieve the requirements. This study item will for example investigate methods to further improve reliability and reduce latency for different use cases (such as factory automation, transport industry and electrical power distribution) that have different requirements potentially stricter than ones considered in Rel-15. For example, some of the use cases considered in Rel. 16 may require reliability on the level of $1-10^{-6}$ and RAN latency on the level of 0.5 to 1 ms. On layer one enhancements the following agreements have been made during RAN1 #94 meeting in Gothenburg [00415]:

Agreements: Further evaluate the potential PDCCH enhancements for NR Rel-16 URLLC. Further evaluate PDCCH reliability. Further evaluate PDCCH blocking. Companies describe the resource utilization. Complexity should be considered. Latency of the enhancement(s) should be considered.

Agreements: Study further how to enable more than one PUCCH for HARQ-ACK transmission within a slot.

Agreements: Study further whether/how to enable enhanced reporting procedure/feedback for HARQ-ACK. Enhanced HARQ-ACK multiplexing on PUSCH and PUCCH. Finer indication for HARQ feedback timing, e.g. symbol-level, half-slot, etc. Note: this may be related to more than one PUCCH for HARQ-ACK tx within a slot. Other enablers are not precluded.

Agreements: Study the need for enhanced CSI reporting/measurement mechanisms. E.g., DMRS based CSI; A-CSI on PUCCH; Trigger by DL assignment; Enhanced CSI reporting mode. Other approaches are not precluded.

Discussion

In the following we discuss different enhancements on physical channels including PUSCH, PDCCH and PUCCH in terms of latency and reliability. To achieve truly high reliability and low latency for URLLC, aspects such as processing timeline and UE capability might also need to be addressed.

Enhancements on PUSCH

Reliability

In Rel. 16 eURLLC SI different relevant use cases can be considered with potentially different reliability requirements. In some use case a very strict reliability requirement of $1-10^{-6}$ was for example mentioned in [1]. It is worth noting that techniques for enhancing reliability can be done at different layers in the protocol stack. Requiring overall transmission reliability of $1-10^{-6}$ does not necessarily mean that all the solutions must come from the physical layer. For example, NR supports higher layer reliability enhancement in the form of PDCP duplication. With PDCP duplication, the reliability requirement on the physical layer can be relaxed.

In NR Rel. 15, a new CQI table for CQI report corresponding to $10^{-5}$ BLER target was introduced. This aims to support URLLC DL transmission with high reliability requirement. Moreover, a new MCS table supporting new MCS entries with low spectral efficiency values was introduced to support very robust PDSCH and PUSCH transmissions. These PHY reliability enhancements made in NR Rel. 15 can be considered sufficient for eURLLC.

Latency

In terms of latency, NR Rel. 15 supports data transmission with shorter duration than a slot. PDSCH/PUSCH mapping Type B allows a transmission to start in any symbol in a slot, which makes it preferable from a latency viewpoint. For PDSCH mapping Type B, transmission durations of 2, 4, and 7 symbols are supported, while for PUSCH mapping Type B all symbol durations up to 14 symbols are supported. These features serve as the key elements to enable low latency transmission required for URLLC.

However, there still exist some limitations in terms of scheduling flexibility in NR Rel. 15 to fully enable ultra-low latency transmission. One example is the restriction on scheduling across the slot border. For URLLC services with strict latency budget, it is highly desirable that data can be transmitted as soon as possible. It could happen for example that UL data for an UL transmission is ready to be transmitted (after some processing time at the UE) in a symbol that is too close to the slot border. Since NR Rel. 15 does not allow transmissions to cross the slot border, the UE has to wait until the beginning of the next slot to transmit. This can lead to an increased latency which exceeds the allowed budget.

Figure 15:
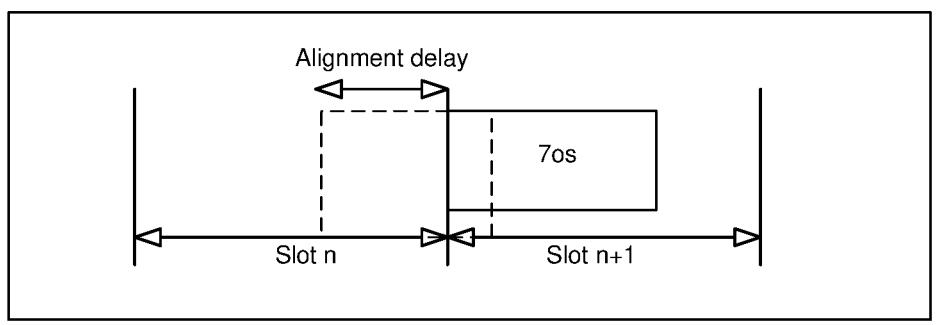
FIG. 15 illustrates a long alignment delay due to transmission across slot border restriction, according to some embodiments.

See for example FIG. 15 for an illustration of high alignment delay when the arrival of data with 7-symbol duration is too close to the slot border. In the case of a 7-symbol transmission, this alignment delay will occur in 50% of UL transmissions assuming data arriving uniformly. The problem is especially severe for the UL transmission where UE is power-limited since increasing bandwidth does not help to improve the performance.

Figure 16:
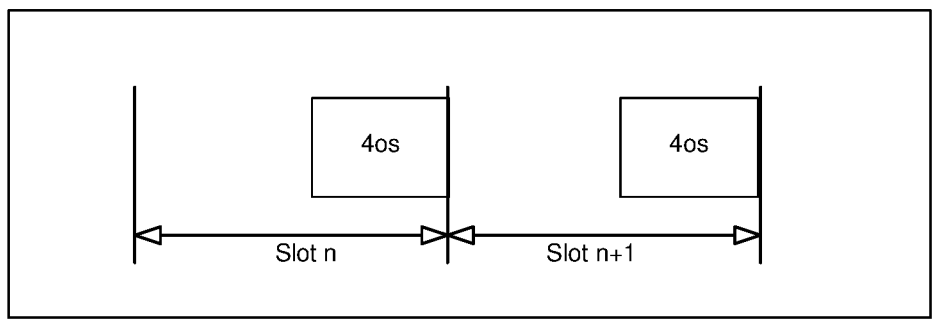
FIG. 16 illustrates slot aggregation when applied to repetition of short transmissions, according to some embodiments.

An alternative to waiting until the next slot is to schedule multiple transmissions with shorter duration so that the transmission can start already in the present slot. Although NR Rel. 15 supports slot aggregation where a transmission can be repeated over multiple slots, there is a limitation that the TB repetition in the next slots needs to have the same resource allocation as the transmission in the first slot. Therefore, the repetition of short transmissions (less than 14 symbols) across multiple slots will have time gaps between them. See for example FIG. 16 for an illustration of mini-slot aggregation, when 4 os mini-slot allocation is repeated in every slot forming the 10 os time gap between transmissions.

To support truly ultra-low latency transmission for eURLLC in Rel. 16 it is proposed that PUSCH scheduling across slot border can be supported. This can come in the forms of having a long transmission crossing a slot border or other different scheduling flexibilities to allow low latency transmission across slot border without excessive delay. We study an impact of this enhancements on alignment delay further in our paper [00415].

Figure 17:
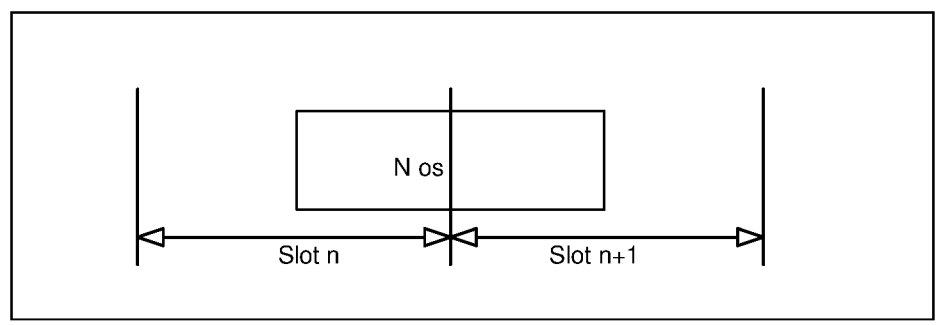
FIG. 17 illustrates a two-repetition PUSCH transmission, according to some embodiments.
Figure 17:
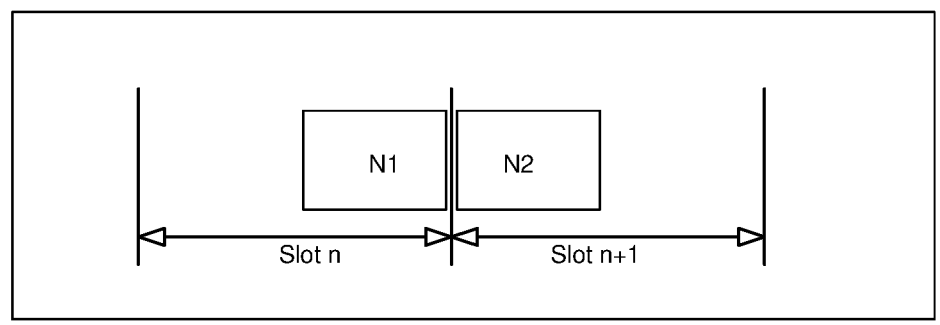

Proposal 1: NR Rel. 16 targeting eURLLC supports more flexible PUSCH scheduling across the slot boundary. One possible solution to support PUSCH transmission across slot border is to use two-PUSCH transmission (See FIG. 17). That is, a UE can expect to receive an UL grant or a configured UL grant which assign resources in time domain crossing the slot border. The UE then interprets that PUSCH transmission is split into two PUSCH transmissions. For example, as shown in the top of FIG. 17, UL data with N-symbol duration is configured or scheduled to cross the slot. As shown in the bottom of FIG. 17, UL data is split into two repetitions. The first PUSCH starts at the configured or assigned starting symbol and ends at the end of the present slot. The second PUSCH starts at the beginning of the subsequent slot and ends at the symbol corresponding to the original configured or scheduled length.

A simple signaling method can e.g. be based on an implicit signaling by allowing direct indicators of start symbol (S) and allocation length (L) in the time-domain resource allocation to result in S+L>14. In this case the first PUSCH starting at the configured or scheduled starting symbol and lasting until the end of the first slot, and the second PUSCH starting immediately in the subsequent slot until the end of scheduled symbol. MSC determination can be done based on number of resource elements for the first and second PUSCHs respectively where the same TBS can be used for both segments of PUSCH transmission. RV can follow some configured RV sequence.

Another approach that is discussed is based on mini-slot repetition. Couple of considerations should be taken with respect to mini-slot repetition. Firstly, from the performance perspective, splitting the PUSCH into two PUSCH has an advantage due to improved coding gain in one of the segments as compared to the repetition based solutions. Secondly, the DMRS overhead in each repetition creates unnecessary additional overhead. Therefore, additional mechanism should be considered to reduce DMRS overhead. Thirdly, repetition based solution would not guarantee that the symbols around the slot boundary are fully utilized for the PUSCH transmission to reduce the delay. Depending on the data arrival and the allocated PUSCH resource, the repetition factor should be dynamically adapted. Since in Rel-15, slot-aggregation is RRC configured, introducing this feature implies that the dynamic repetition should be supported in Rel-16 to make the feature meaningful.

In addition, the reliability can be improved by frequency hopping. However consideration should be taken into account whether frequency hopping results in fragmented spectrum, impacting the total system performance. Therefore, frequency hopping should be dynamically enabled or disabled. Moreover, frequency hopping if enabled, can be performed based on the existing inter-slot and intra-slot frequency hopping. In some cases, it may however not be desirable to have a hopping position in asymmetric fashion with respect to PUSCH allocation. In that case, it is possible to consider a hopping pattern where the hopping position is based on intra-slot frequency hopping of either of the repetitions with some rule, e.g., the slot where there are more number of symbols.

Based on the above discussion, we propose the following:

Proposal 2: Consider the following alternatives for PUSCH scheduling across slot border:

Alt 1) Methods based on two PUSCH transmissions across the slot boundary based on implicit signaling by using the start symbol (S) and allocation length (L) in the time-domain resource allocation and S+L>14.

The first PUSCH transmission starts at symbol S until the end of the slot.

The second PUSCH transmission starts at the beginning of next slot including the remaining symbols.

FFS on same or configured RV for two PUSCHs.

Alt 2) Methods based on mini-slot repetition

Support dynamic repetition

Support Dynamic frequency hopping.

FFS on how to reduce DMRS overhead

Study whether Alt 2 is beneficial with respect to performance and signaling overhead as compared to Alt 1.

Enhancements on PDCCH

During RAN1 #94 several possibilities on PDCCH enhancements were discussed. Companies agreed to study PDCCH enhancements further and consider different aspects, i.e. blocking, reliability and complexity [00415]. In this section we discuss limitation of number of blind decodes and CCEs for URLLC, as well as aspect of PDCCH blocking and possible improvement from the use of compact DCI format with smaller DCI size than the fallback DCI.

Limits on number of blind decode and CCE

With strict requirement in terms of latency (0.5-1 ms) and reliability ($1\text{-}10^{-6}$) mentioned in the eURLLC SID [1], it is important that PDSCH/PUSCH mapping type B is supported. To achieve the full latency benefits of type B scheduling, it is necessary to have multiple PDCCH monitoring occasions within a slot. For example, to get the full benefits of 2 OFDM symbol transmissions, it is preferable to have PDCCH monitoring every 2 OFDM symbols. The limits in Rel. 15 on the total number of blind decodes and CCEs for channel estimation in a slot strongly restricts the scheduling options for these kinds of configurations, even when limiting the number of candidates in a search space. In this section, we provide views on how this limit should be relaxed for NR URLLC Rel.16.

In LTE, the number of blind decodes was increased with the introduction of sTTI. This is due to new sTTI structure where subslot of 2 or 3 os (corresponding to 6 monitoring occasions within a subframe) and slot of 7 os (corresponding to 2 monitoring occasions within a subframe) are supported. The baseline for one component carrier in LTE is 44 blind decodes per 1 ms subframe, of which 12 are for CSS and 32 for USS. With sTTI, there can be 24 additional BDs with 1-slot sTTI and 36 additional BDs with 2/3 OS sTTI. Therefore, the total number of blind decodes per 1 ms subframe in LTE was increased as summarized in the table below.

Based on the analysis in the companion contribution [00415], at least a PDCCH monitoring periodicity of less than 5 symbols is necessary for satisfying the 1 ms latency target. The PDCCH monitoring periodicity means, for example, PDCCH can start in symbol 0, 5, 10 in a slot, resulting in 3 monitoring occasions in a slot.

TABLE 8

Number of blind decodes for LTE with sTTI

| Case | Monitoring occasions per 1 ms | 1 ms DCI monitoring CSS | 1 ms DCI monitoring USS | sTTI DCI monitoring (USS) | Total |
|---|---|---|---|---|---|
| No sTTI | 1 | 12 | 32 | — | 44 |
| 1-slot (7 OS) sTTI | 2 | 12 | 32 | 24 | 68 |
| 2/3 OS sTTI | 6 | 12 | 32 | 36 | 80 |

Observation 1: To support URLLC with latency requirement of 1 ms, more than three PDCCH monitoring occasions per slot are required.

If AL=16 is needed, these three monitoring occasions take up 48 of the 56 allowed CCEs for channel estimation in Rel. 15, severely restricting the usage of both USS and CSS for scheduling URLLC traffic.

The above observation is only the minimum number of monitoring occasions required to support at least a single-shot transmission with 15 kHz SCS fulfilling URLLC latency requirement. As mentioned earlier the number of monitoring occasions in a slot for NR could in principle be flexible, i.e., anything from every 1 to 14 os. As can be seen in [00415], allowing more PDCCH monitoring opportunities per slot allows scheduling of URLLC traffic with retransmission opportunities, which leads to more efficient resource usage.

Rather than specifying multiple new UE capability levels, it is proposed to specify one additional level of support for PDCCH blind decodes, for which the numbers are doubled compared to Rel.15.

For this additional level of support, instead of simply defining it per slot basis, it makes more sense to take into account how the BDs/CCEs are distributed in a slot for mini-slot operation. One possible choice is to define the BD/CCE limit for each half of the slot. For the first half of the slot, it is natural to assume the same number as the other cases. For the second half of the slot, assuming that UE has finished processing PDCCH in the first half of the slot, the UE should have the same PDCCH processing capability in the second half of the slot. Therefore, it is reasonable to assume the same number as in the first slot.

Based on the above analysis, the corresponding increase in the BD limits is proposed:

TABLE 9

Number of blind decodes for Rel. 15 and proposed values for Rel. 16

| Max no. of PDCCH BDs per slot | Sub-carrier spacing | | | |
|---|---|---|---|---|
| | 15 kHz | 30 kHz | 60 kHz | 120 kHz |
| Case 1 | 44 | 36 | 22 | 20 |
| Case 2 (Rel 15) | 44 | 36 | 22 | 20 |
| Case 2 (Rel 16) $1^{st}$ half of the slot | 44 | 36 | 22 | 20 |
| $2^{nd}$ half of the slot | 44 | 36 | 22 | 20 |

Similarly, a corresponding increase in the CCE limits is proposed:

TABLE 10

CCE limit for Rel. 15 and proposed values for Rel. 16.

| Max no. of PDCCH CCEs per slot | Sub-carrier spacing | | | |
|---|---|---|---|---|
| | 15 kHz | 30 kHz | 60 kHz | 120 kHz |
| Case 1 | 56 | 56 | 48 | 32 |
| Case 2 (Rel 15) | 56 | 56 | 48 | 32 |
| Case 2 (Rel 16) $1^{st}$ half of the slot | 56 | 56 | 48 | 32 |
| $2^{nd}$ half of the slot | 56 | 56 | 48 | 32 |

For example, for 120 kHz SCS, with the existing limit of 32 CCEs per slot, there can be at most two AL16 candidates per slot, which can be very limiting for URLLC requiring at least two monitoring occasions in a slot. The proposed value would allow more flexible PDCCH scheduling and reduce blocking probability. As an alternative solution to table 2 and 3, one can consider to introduce a limitation per sliding window, where sliding window size and number of blind decodes or CCE per window can be further discussed. For the NR URLLC Rel. 16, the following number of blind decodes and CCEs for channel estimation can be considered.

Proposal 3: For NR Rel. 16 considering URLLC, the number of PDCCH blind decodes for PDCCH monitoring occasion(s) whose first symbol(s) are in the first half slot is {44, 36, 22, 20} for SCS {15 kHz, 30 kHz, 60 kHz, 120 kHz}, and for PDCCH monitoring occasion(s) whose first symbol(s) are in the second half slot is {44, 36, 22, 20} for SCS {15 kHz, 30 kHz, 60 kHz, 120 kHz}.

Proposal 4: For NR Rel. 16 considering URLLC, number of CCEs for channel estimation for PDCCH monitoring occasion(s) whose first symbol(s) are in the first half slot is {56, 56, 48, 32} for SCS {15 kHz, 30 kHz, 60 kHz, 120 kHz}, and for PDCCH monitoring occasion(s) whose first symbol(s) are in the second half slot is {56, 56, 48, 32} for SCS {15 kHz, 30 kHz, 60 kHz, 120 kHz}.

PDCCH Blocking

High PDCCH reliability is critical to satisfy URLLC reliability requirement. NR PDCCH design addresses this aspect with the support of AL16. However, there remains some concern on PDCCH resource usage. That is, if there are multiple UEs being scheduled at the same time and some of them requiring high AL, available control resources may not be sufficient to schedule all the UEs and PDCCH blocking starts to occur.

In our companion contribution [5], PDCCH blocking probability is evaluated for the macro scenario. DL geometry is derived and used together with PDCCH link level results to obtain aggregation level distribution at the PDCCH reliability target of $10^{-5}$. We observe that blocking probability generally depends on several parameters such as number of UEs, CORESET sizes, DCI sizes, and traffic model. From the results shown in FIG. 4, we see that it is more meaningful to use larger CORESET size to reduce the blocking probability.

Figure 18:
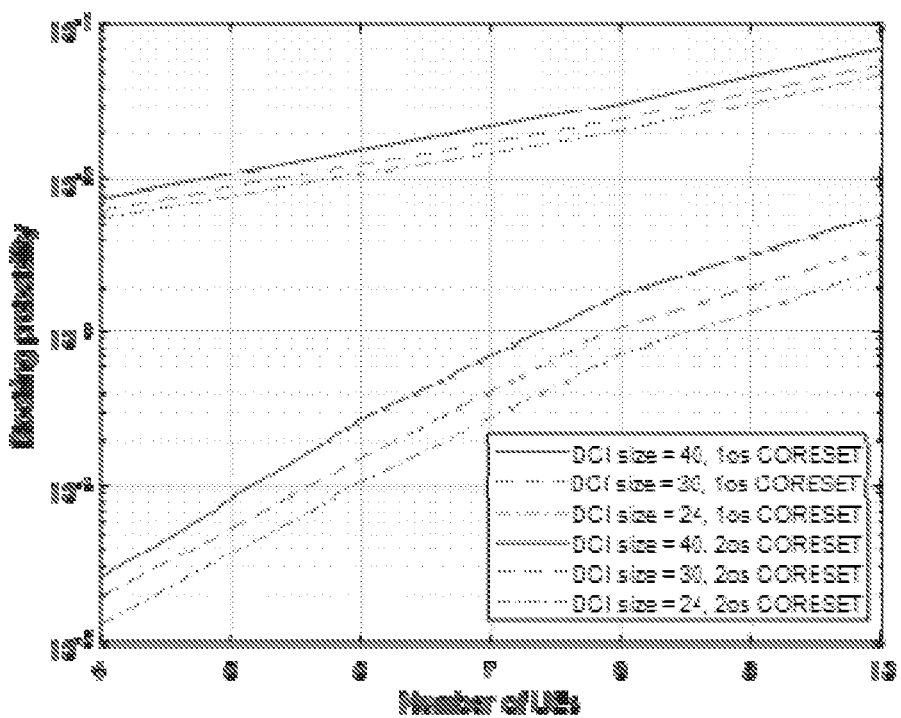
FIG. 18 illustrates blocking probability as a function of number of UEs, DCI size, and CORESET size, according to some embodiments.

Using smaller DCI size, e.g. compact DCI can reduce blocking probability but only to a small extent. Also, there are other consequences of introducing the compact DCI, e.g., increased blind decoding complexity at the UE, and reduced data scheduling flexibility. All these aspects have to be taken into account. If the goal is to improve blocking probability to the level relevant for URLLC, relying on compact DCI may not be the right approach. FIG. 18 illustrates blocking probability as a function of number of UEs, DCI size, and CORESET size.

Proposal 5: Consider the tradeoff between PDCCH blocking reduction and PDSCH scheduling flexibility from using compact DCI taking into account additional complexity of introducing a new DCI format.

Enhancements on UE Processing Timeline

Figure 19:
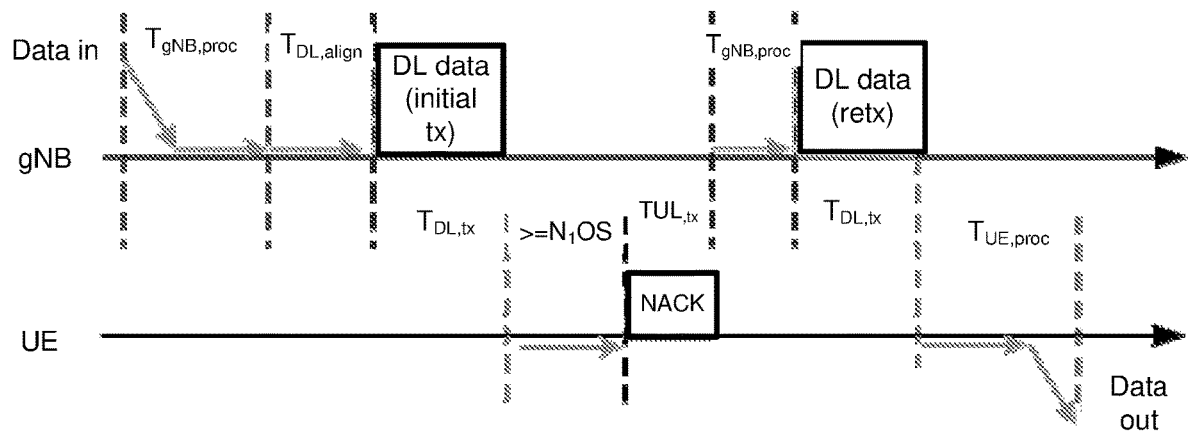
FIG. 19 illustrates downlink data latency with one retransmission, according to some embodiments.
Figure 20:
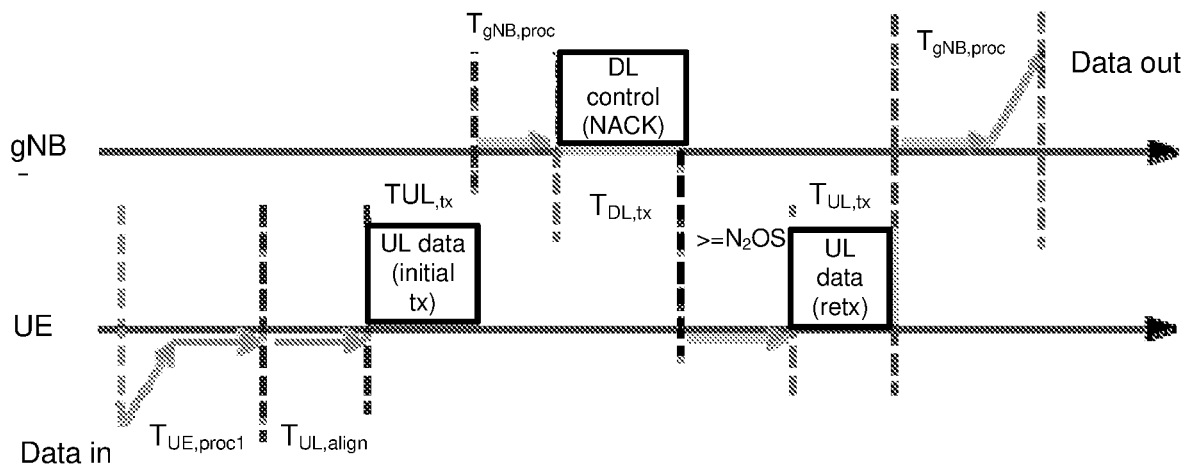
FIG. 20 illustrates uplink data latency with configured grant and one retransmission, according to some embodiments.

The DL data transmission timeline is illustrated in FIG. 19 with one retransmission. The UL data transmission timeline is illustrated in FIG. 20 for PUSCH via configured UL grant. The delay components are shown in the table below:

TABLE 11

$T_{UE,proc}$: UE processing time for UL transmission. $T_{UE,proc}$ varies depending on DL data vs UL data, initial transmission vs retransmission, etc. In UE Capability #1 and Capability #2 discussion, variables $N_1$ and $N_2$ are used:
$N_1$ is the number of OFDM symbols required for UE processing from the end of PDSCH to the earliest possible start of the corresponding ACK/NACK transmission on PUSCH or PUCCH from UE perspective.
$N_2$ is the number of OFDM symbols required for UE processing from the end of PDCCH containing the UL grant reception to the earliest possible start of the corresponding the same PUSCH transmission from UE perspective.
$T_{UL,tx}$: transmission time of UL data. This is roughly equal to PUSCH duration.
$T_{UL,align}$: time alignment to wait for the next UL transmission opportunity.
$T_{gNB,proc}$: gNB processing time for DL transmission. $T_{gNB,proc}$ varies depending on DL data vs UL data, initial transmission vs retransmission, etc. For example, for PDSCH retransmission, this includes processing time of HARQ-ACK sent on UL. For PUSCH, this includes reception time of PUSCH.
In latency evaluation of [00415], for DL data, the gNB processing is similar to data preparation time so we assume $T_{gNB,proc}$ is equal to $N_2$ OFDM symbol (OS). For UL data, the gNB processing is similar to data decoding time plus preparing for feedback, so we assume $T_{gNB,proc}$ is equal to $N_1$ OS.
$T_{DL,tx}$: transmission time of DL data. This is roughly equal to PDSCH duration.
$T_{DL,align}$: time alignment to wait for the next DL transmission opportunity.

$T_{UE,proc}$ is an important latency component to improve. In Rel-15, UE processing time capability #1 and #2 have been defined, where capability #1 is defined for SCS of 15/30/60/120 kHz, and capability #2 defined for SCS of 15/30/60 kHz. Evaluation results in show that the more aggressive capability #2 is still inadequate for the 1 ms latency constraint. For eURLLC, shorter than 1 ms latency (e.g., 0.5 ms) needs to be studied. To fulfil the latency requirements, we propose that capability #3 be defined in Rel-16.

TABLE 12

| UE processing time capability #3 | | | | | |
|---|---|---|---|---|---|
| Configuration | HARQ Timing (in number of OS) | 15 kHz SCS | 30 kHz SCS | 60 kHz SCS | 120 kHz SCS |
| Front-loaded DMRS only | N1 | 2.5 | 2.5 | 5 | 10 |
| Frequency-first RE-mapping | N2 | 2.5 | 2.5 | 5 | 10 |

Proposal 6: Define further aggressive UE processing time capability #3 for Rel-16.

Proposal 7: The UE processing time capability #3 is 2.5/2.5/5/10 OS for 15/30/60/120 kHz SCS.

While N1 gives the minimum number of OFDM symbols from end of PDSCH until beginning of HARQ-ACK transmission on PUCCH, the actual transmission time of HARQ-ACK is further limited by the allowed timing within the slot. In Rel-15, at most one PUCCH transmission including HARQ-ACK is supported per slot. This will add alignment time for sending the HARQ-ACK. To reduce DL data latency, it is necessary to increase the number of PUCCH opportunities for HARQ-ACK transmission in a slot, especially if multiplexing of eMBB and URLLC traffic is supported.

Proposal 8: Support at least two PUCCH transmissions for HARQ-ACK in a slot for Rel-16.

For $T_{DL,align}$, this is significantly influenced by PDCCH perioridicity. The worst case $T_{DL,align}$ is equal to the PDCCH periodicity. In Rel-15, PDCCH periodicity is affected by several constraints, including: (a) blind decoding limits, (b) #CCE limits), (c) DCI sizes. In order to provide shorter PDCCH periodicity for eURLLC, it is necessary that the blind decoding limits and #CC #limits be increased in Rel-16. This is discussed in Section 2.2.2.

Enhancements on UCI Transmission

For a UE running mixed services with both eMBB and URLLC the reliability requirements on UCI transmitted on PUSCH can differ significantly from the PUSCH data. The reliability requirement on the UCI can either be higher than the requirement on the PUSCH data, e.g. when transmitting HARQ-ACK for DL URLLC data at the same time as eMBB data, or lower, e.g. when transmitting CQI reports meant for eMBB at the same time as URLLC data. In the case where UCI has lower requirement than PUSCH data it may be preferable to drop some or all of the UCI.

Observation 2: The reliability requirements for UCI and UL data can vary significantly for UEs supporting both eMBB and URLLC. Either UCI or PUSCH data can need higher reliability. The split of resources between UCI and PUSCH data is controlled through beta factors for different kinds of UCI. The beta factors defined in Rel. 15 have a lowest value of 1.0. This value might not be low enough when considering URLLC data together with eMBB UCI.

Proposal 9: Consider increasing the range for beta factors in Rel. 16 to include values less than 1.0, including down to 0.0, allowing for dropping of HARQ-ACK/CSI bits from UCI.

In our companion paper [00415] it is observed that when UCI is transmitted on PUCCH the reliability requirement can also differ significantly if UCI is related to eMBB or URLLC. Especially a HARQ-ACK relating to eMBB does not need to be as reliable as a HARQ-ACK relating to URLLC. In our paper it is observed that for PUCCH Format 0 and Format 1 the suitable methods to control reliability is limited to selection of number of symbols and/or power adjustment. It is also observed that NR Rel-15 does not support fast adjustment of reliability using power control. In some scenarios adjustment of reliability using selection of number of symbols may not be enough in a mixed-services scenario. Therefore, we propose:

Proposal 10: Consider enhancements in PUCCH power control to enable larger power difference between PUCCH transmission related to eMBB and PUCCH transmission related to URLLC: (1) New TPC table allowing larger power adjustment steps, and/or (2) Dynamic indication of power setting (e.g., $P_0$, closed-loop index) using DCI indication Conclusion In section, we discussed the potential L1 enhancements for NR operation for URLLC services supported in Rel-16. Based on the discussion, we made the following observations and proposals:

Observation 1 To support URLLC with latency requirement of 1 ms, more than three PDCCH monitoring occasions per slot are required.

Observation 2 The reliability requirements for UCI and UL data can vary significantly for UEs supporting both eMBB and URLLC. Either UCI or PUSCH data can need higher reliability.

Proposal 1 NR Rel. 16 targeting eURLLC supports more flexible PUSCH scheduling across the slot boundary.

Proposal 2 Consider the following alternatives for PUSCH scheduling across slot border: Alt 1) Methods based on two PUSCH transmissions across the slot boundary based on implicit signaling by using the start symbol (S) and allocation length (L) in the time-domain resource allocation and S+L>14. The first PUSCH transmission starts at symbol S until the end of the slot. The second PUSCH transmission starts at the beginning of next slot including the remaining symbols. FFS on same or configured RV for two PUSCHs Alt 2) Methods based on mini-slot repetition. Support dynamic repetition. Support Dynamic frequency hopping. FFS on how to reduce DMRS overhead. Study whether Alt 2 is beneficial with respect to performance and signaling overhead as compared to Alt 1.

Proposal 3 For NR Rel. 16 considering URLLC, the number of PDCCH blind decodes for PDCCH monitoring occasion(s) whose first symbol(s) are in the first half slot is {44, 36, 22, 20} for SCS {15 kHz, 30 kHz, 60 kHz, 120 kHz}, and for PDCCH monitoring occasion(s) whose first symbol(s) are in the second half slot is {44, 36, 22, 20} for SCS {15 kHz, 30 kHz, 60 kHz, 120 kHz}.

Proposal 4 For NR Rel. 16 considering URLLC, number of CCEs for channel estimation for PDCCH monitoring occasion(s) whose first symbol(s) are in the first half slot is {56, 56, 48, 32} for SCS {15 kHz, 30 kHz, 60 kHz, 120 kHz}, and for PDCCH monitoring occasion(s) whose first symbol(s) are in the second half slot is {56, 56, 48, 32} for SCS {15 kHz, 30 kHz, 60 kHz, 120 kHz}.

Proposal 5 Consider the tradeoff between PDCCH blocking reduction and PDSCH scheduling flexibility from using compact DCI taking into account additional complexity of introducing a new DCI format.

Proposal 6 Define further aggressive UE processing time capability #3 for Rel-16.

Proposal 7 The UE processing time capability #3 is 2.5/2.5/5/10 OS for 15/30/60/120 kHz SCS.

Proposal 8 Support at least two PUCCH transmissions for HARQ-ACK in a slot for Rel-16.

Proposal 9 Consider increasing the range for beta factors in Rel. 16 to include values less than 1.0, including down to 0.0, allowing for dropping of HARQ-ACK/CSI bits from UCI.

Proposal 10 Consider enhancements in PUCCH power control to enable larger power difference between PUCCH transmission related to eMBB and PUCCH transmission related to URLLC: New TPC table allowing larger power adjustment steps, and/or Dynamic indication of power setting (e.g., P0, closed-loop index) using DCI indication.

References [1] RP-181477 New SID on Physical Layer Enhancements for NR URLLC, Huawei, HiSilicon, Nokia, Nokia Shanghai Bell. [2] RAN1 #94 Chairman's Notes. [3] R1-1811112 Alignment Delay Study For URLLC Latency, Ericsson, October 2018. [4] R1-1810177 Latency Evaluation of Rel-15 URLLC, Ericsson, October 2018. [5] R1-1811109 Performance Evaluation of PDCCH for URLLC, Ericsson, October 2018. [6] R1-1811111 Uplink power control enhancement for NR URLLC, Ericsson, October 2018.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. Also, the phrase "receiving from" should construed to cover receiving directly from or receiving indirectly from. That is, a first entity receives a message from a second entity even in the case where a third entity receives the message transmitted by the second entity and then forwards the message to the first entity.

The invention claimed is:

1. A method performed by a wireless device for repetition signalling, the method comprising:
    receiving a control message, the control message comprising an indication of an index value; and
    obtaining, using the index value, a set of parameters from time domain resource allocation (TDRA) configuration information, the set of parameters comprising an aggregation factor.

2. The method of claim 1, wherein the TDRA configuration information comprises at least one of a physical uplinked shared channel (PUSCH) TDRA configuration or a physical downlink shared channel (PDSCH) TDRA configuration, and the set of parameters further comprise a slot offset, a mapping type, and at least one of: (i) a start symbol and an allocation length or (ii) a start and length indicator variable.

3. The method of claim 1, wherein the set of parameters further comprises an indication to use at least one of slot aggregation or back-to-back repetition of transmissions in accordance with the aggregation factor.

4. The method of claim 1, further comprising:
    determining that using back-to-back repetition with the aggregation factor would result in a first transmission occupying a first slot and at least one transmission at least partly occupying a second slot different than the first slot; and,
    as a result of the determining: (i) determining not to transmit the at least one transmission at least partly occupying the second slot, (ii) shortening the at least one transmission at least partly occupying the second slot such that it no longer at least partly occupies the second slot, or (iii) splitting the at least one transmission at least partly occupying the second slot into a plurality of transmissions each occupying only one slot.

5. The method of claim 1, further comprising:
    determining that using back-to-back repetition with the aggregation factor would result in a first transmission occupying a first slot and at least one transmission at least partly occupying a second slot different than the first slot; and,
    as a result of the determining: (i) determining to not receive the at least one transmission at least partly occupying the second slot, (ii) receiving a shortened transmission of the at least one transmission at least partly occupying a second slot such that the shortened transmission no longer at least partly occupies the second slot, or (iii) receiving a split transmission of the at least one transmission at least partly occupying the second slot such that the split transmission comprises a plurality of transmissions each occupying only one slot.

6. The method of claim 1, wherein the aggregation factor indicates at least one of a number of individual repetitions or a number of slots over which a resource allocation should be repeated.

7. The method of claim 1, wherein the control message is (i) downlink control information (DCI) transmitted on a physical downlink control channel (PDCCH), (ii) a configuration message transmitted on radio resource control (RRC), or (iii) a combination of DCI transmitted on PDCCH and a configuration message transmitted on RRC.

8. The method of claim 1, wherein the aggregation factor is a splitting factor or partitioning indicator indicating that a transmission defined by a start S and length L shall be split in two or more repetitions.

9. The method of claim 1, wherein the index value comprises a row index in the TDRA configuration information.

10. A wireless device comprising:
    processing circuitry configured to perform a method comprising steps of:
        receiving a control message, the control message comprising an indication of an index value; and
        obtaining, using the index value, a set of parameters from time domain resource allocation (TDRA) configuration information, the set of parameters comprising an aggregation factor.

* * * * *

UNITED STATES PATENT AND TRADEMARK OFFICE
CERTIFICATE OF CORRECTION

| | |
|---|---|
| PATENT NO. | : 12,177,829 B2 |
| APPLICATION NO. | : 17/275210 |
| DATED | : December 24, 2024 |
| INVENTOR(S) | : Andersson et al. |

It is certified that error appears in the above-identified patent and that said Letters Patent is hereby corrected as shown below:

In the Drawings

In FIG. 2, Sheet 2 of 20, for Tag "272", Line 1, delete "Tranceiver" and insert -- Transceiver --, therefor.

In FIG. 2, Sheet 2 of 20, delete "270 Wireless Signal".

In FIG. 2, Sheet 2 of 20, for Tag "216", Line 1, delete "Amplifier(S)" and insert -- Amplifier(s) --, therefor.

In FIG. 2, Sheet 2 of 20, for Tag "218", Line 1, delete "Filter(S)" and insert -- Filter(s) --, therefor.

In FIG. 2, Sheet 2 of 20, for Tag "222", Line 1, delete "Tranceiver" and insert -- Transceiver --, therefor.

In the Specification

In Column 4, Line 5, delete "an" and insert -- as an --, therefor.

In Columns 3 & 4, in Table 2, Line 11, delete "-- TAG-PDSCH-TIMEDOMAINRESOURCEALLOCATIONLIST-S TOP" and insert -- --TAG-PDSCH-TIMEDOMAINRESOURCEALLOCATIONLIST-STOP --, therefor.

In Columns 3 & 4, in Table 3, Line 3, delete "corresponhds" and insert -- corresponds --, therefor.

In Column 9, Line 36, delete "an" and insert -- as an --, therefor.

In Column 10, Line 19, delete "as" and insert -- as in --, therefor.

In Column 10, Line 65, delete "that three" and insert -- three --, therefor.

Signed and Sealed this
Fourteenth Day of October, 2025

John A. Squires
*Director of the United States Patent and Trademark Office*

CERTIFICATE OF CORRECTION (continued)
U.S. Pat. No. 12,177,829 B2

In Columns 11 & 12, in Table 7, Line 7, delete "RVseguence:" and insert -- RVsequence: --, therefor.

In Column 15, Line 14, delete "units" and insert -- units. --, therefor.

In Column 16, Line 27, delete "circuitry 290" and insert -- circuitry 292 --, therefor.

In Column 17, Line 43, delete "(CPE)." and insert -- (CPE), --, therefor.

In Column 17, Line 61, delete "etc.)" and insert -- etc.), --, therefor.

In Column 18, Line 30, delete "circuitry 214" and insert -- circuitry 212 --, therefor.

In Column 21, Line 6, delete "UE 3200" and insert -- UE 300 --, therefor.

In Column 21, Line 13, delete "UNITS," and insert -- UMTS, --, therefor.

In Column 21, Line 14, delete "term" and insert -- terms --, therefor.

In Column 21, Line 15, delete "interchangeable." and insert -- interchangeably. --, therefor.

In Column 21, Line 24, delete "source 333," and insert -- source 313, --, therefor.

In Column 24, Line 26, delete "490. Memory 490" and insert -- 490-1. Memory 490-1 --, therefor.

In Column 29, Line 46, delete "according" and insert -- according to --, therefor.

In Column 30, Line 37, delete "according" and insert -- according to --, therefor.

In Column 32, Line 12, delete "information" and insert -- information. --, therefor.

In Column 33, Line 7, delete "configured." and insert -- configured --, therefor.

In Column 36, Line 5, delete "3 GPP" and insert -- 3GPP --, therefor.

In Column 36, Line 13, delete "Carrier Component" and insert -- Component Carrier --, therefor.

In Column 36, Line 15, delete "Multiplexing" and insert -- Multiple --, therefor.

In Column 36, Line 16, delete "Identifier" and insert -- Identity --, therefor.

In Column 36, Line 20, delete "CPICH Ec/NoCPICH" and insert -- CPICH Ec/No CPICH --, therefor.

In Column 36, Line 22, delete "information" and insert -- Indicator --, therefor.

In Column 36, Line 38, delete "E-SMLC evolved Serving Mobile Location Center".

CERTIFICATE OF CORRECTION (continued)
U.S. Pat. No. 12,177,829 B2

In Column 36, Line 56, delete "MBSFNMultimedia" and insert -- MBSFN Multimedia --, therefor.

In Column 37, Line 9, delete "PDCCHPhysical" and insert -- PDCCH Physical --, therefor.

In Column 37, Line 10, delete "Profile" and insert -- Power --, therefor.

In Column 37, Line 12, delete "Packet Gateway" and insert -- Packet Data Network Gateway --, therefor.

In Column 37, Line 16, delete "Precoder" and insert -- Precoding --, therefor.

In Column 37, Line 17, delete "PRACHPhysical" and insert -- PRACH Physical --, therefor.

In Column 37, Line 20, delete "PUCCHPhysical" and insert -- PUCCH Physical --, therefor.

In Column 37, Line 26, delete "Management" and insert -- Monitoring --, therefor.

In Column 37, Line 48, delete "Self Optimized" and insert -- Self-Organizing --, therefor.

In Column 37, Line 63, delete "UTRANUniversal" and insert -- UTRAN Universal --, therefor.

In Column 37, Line 64, delete "Wide" and insert -- Wideband --, therefor.

In Column 37, Line 65, delete "Wide" and insert -- Wireless --, therefor.

In Column 38, Line 21, delete "RAN1 #94" and insert -- RAN1#94 --, therefor.

In Column 40, Line 66, delete "RAN1 #94" and insert -- RAN1#94 --, therefor.

In Columns 43 & 44, in Table 11, Line 7, delete "N2" and insert -- $N_2$ --, therefor.

In Column 44, Line 2, delete "defined" and insert -- is defined --, therefor.

In Column 44, Line 41, delete "perioridicity." and insert -- periodicity. --, therefor.

In Column 44, Line 66, delete "limits)," and insert -- limits, --, therefor.

In Column 45, Line 1, delete "#CC #limits" and insert -- #CC# limits --, therefor.

In Column 45, Line 48, delete "In" and insert -- In this --, therefor.